US008575895B2

(12) United States Patent
Garrastacho et al.

(10) Patent No.: US 8,575,895 B2
(45) Date of Patent: Nov. 5, 2013

(54) METHOD AND DEVICE FOR VOLTAGE DETECTION AND CHARGING OF ELECTRIC BATTERY

(75) Inventors: Eddie Garrastacho, Miami, FL (US); Saied Hussaini, Miami, FL (US); John Castellanos, Miami, FL (US)

(73) Assignee: Rally Manufacturing, Inc., Miami, FL (US)

( * ) Notice: Subject to any disclaimer, the term of this patent is extended or adjusted under 35 U.S.C. 154(b) by 344 days.

(21) Appl. No.: 13/074,703

(22) Filed: Mar. 29, 2011

(65) Prior Publication Data

US 2012/0249083 A1 Oct. 4, 2012

(51) Int. Cl.
*H02J 7/00* (2006.01)
*H02J 7/04* (2006.01)

(52) U.S. Cl.
USPC ............ 320/125; 320/155; 320/160; 320/162

(58) Field of Classification Search
USPC .................................. 320/125, 155, 160, 162
See application file for complete search history.

(56) References Cited

U.S. PATENT DOCUMENTS

| | | | |
|---|---|---|---|
| 5,049,804 A | 9/1991 | Hutchings | |
| 5,250,891 A | 10/1993 | Glasgow | |
| 5,449,997 A * | 9/1995 | Gilmore et al. | 320/148 |
| 5,619,116 A | 4/1997 | Takano et al. | |
| 5,894,415 A * | 4/1999 | Habegger | 363/65 |
| 5,973,480 A | 10/1999 | Takano et al. | |
| 6,161,248 A | 12/2000 | Merkel et al. | |
| 6,188,199 B1 | 2/2001 | Beutler et al. | |
| 6,191,552 B1 | 2/2001 | Kates et al. | |
| 6,275,006 B1 | 8/2001 | Koike et al. | |
| 6,337,557 B1 | 1/2002 | Kates et al. | |
| 6,523,218 B1 | 2/2003 | Kotlarski | |
| 6,553,607 B1 | 4/2003 | De Block | |
| 6,611,988 B1 | 9/2003 | De Block | |
| 6,836,926 B1 | 1/2005 | De Block | |
| 6,973,698 B1 | 12/2005 | Kotlarski | |
| 6,978,512 B2 | 12/2005 | Dietrich et al. | |
| 7,228,588 B2 | 6/2007 | Kraemer et al. | |
| 7,293,321 B2 | 11/2007 | Breesch | |
| 7,323,847 B2 | 1/2008 | Meyer et al. | |
| RE40,223 E | 4/2008 | Koike et al. | |
| 7,365,515 B2 | 4/2008 | Takano et al. | |
| 7,451,520 B2 | 11/2008 | Weiler et al. | |
| 7,468,596 B2 | 12/2008 | Shum | |

(Continued)

FOREIGN PATENT DOCUMENTS

DE 100 43 426 3/2002

*Primary Examiner* — M'Baye Diao
(74) *Attorney, Agent, or Firm* — Berenato & White, LLC

(57) ABSTRACT

A device and method for rated voltage detection and charging of electric batteries. The method comprises the steps of measuring a terminal voltage of the battery having first or second rated voltages, comparing the terminal voltage to a number of threshold voltages between a minimum threshold voltage and a maximum threshold voltage, determining a condition of the battery, which can be ready to charge or fault, based on a comparison of the terminal voltage to the threshold voltages, determining that the rated voltage of the electric battery is the second rated voltage if the determined condition of the electric battery is ready to charge, conducting a pre-charge process if the determined condition of the battery is neither ready to charge nor fault, determining the rated voltage of the electric battery based on a response to the pre-charge process, and charging the electric battery according to the determined rated voltage.

28 Claims, 12 Drawing Sheets

(56) References Cited

U.S. PATENT DOCUMENTS

| | | |
|---|---|---|
| 7,484,264 B2 | 2/2009 | Kraemer et al. |
| 7,523,520 B2 | 4/2009 | Breesch |
| 8,044,640 B2 * | 10/2011 | Cruise et al. ......... 320/162 |
| 8,193,772 B2 * | 6/2012 | Radke et al. ......... 320/134 |
| 8,274,261 B2 * | 9/2012 | Seman et al. ......... 320/134 |
| 2003/0048096 A1 | 3/2003 | Liu et al. |
| 2005/0189914 A1 | 9/2005 | Esses |
| 2006/0108984 A1 * | 5/2006 | Johnson et al. ......... 320/128 |
| 2006/0207050 A1 | 9/2006 | Shanmugham et al. |
| 2010/0085021 A1 * | 4/2010 | Cruise et al. ......... 320/162 |

* cited by examiner

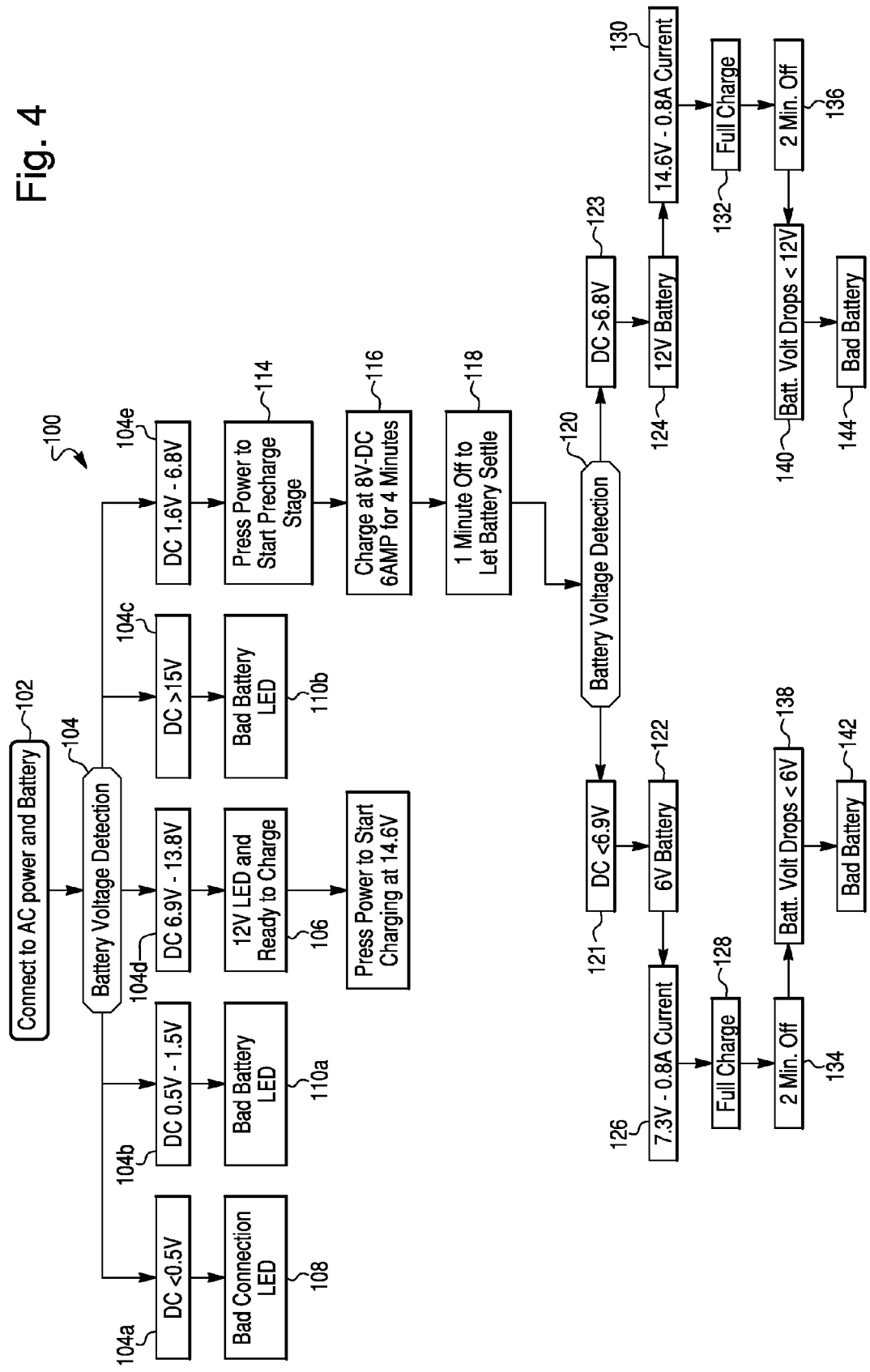

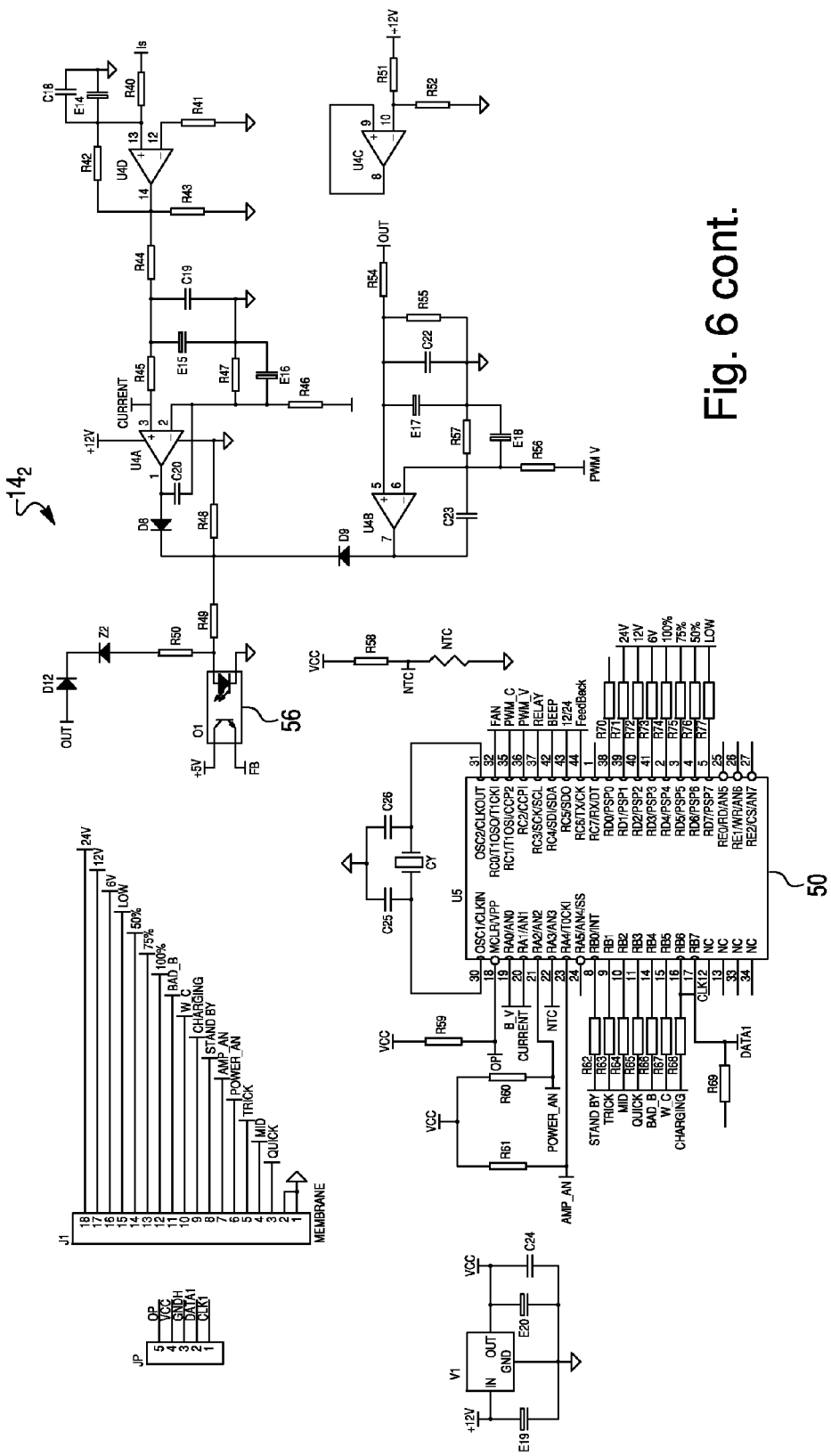

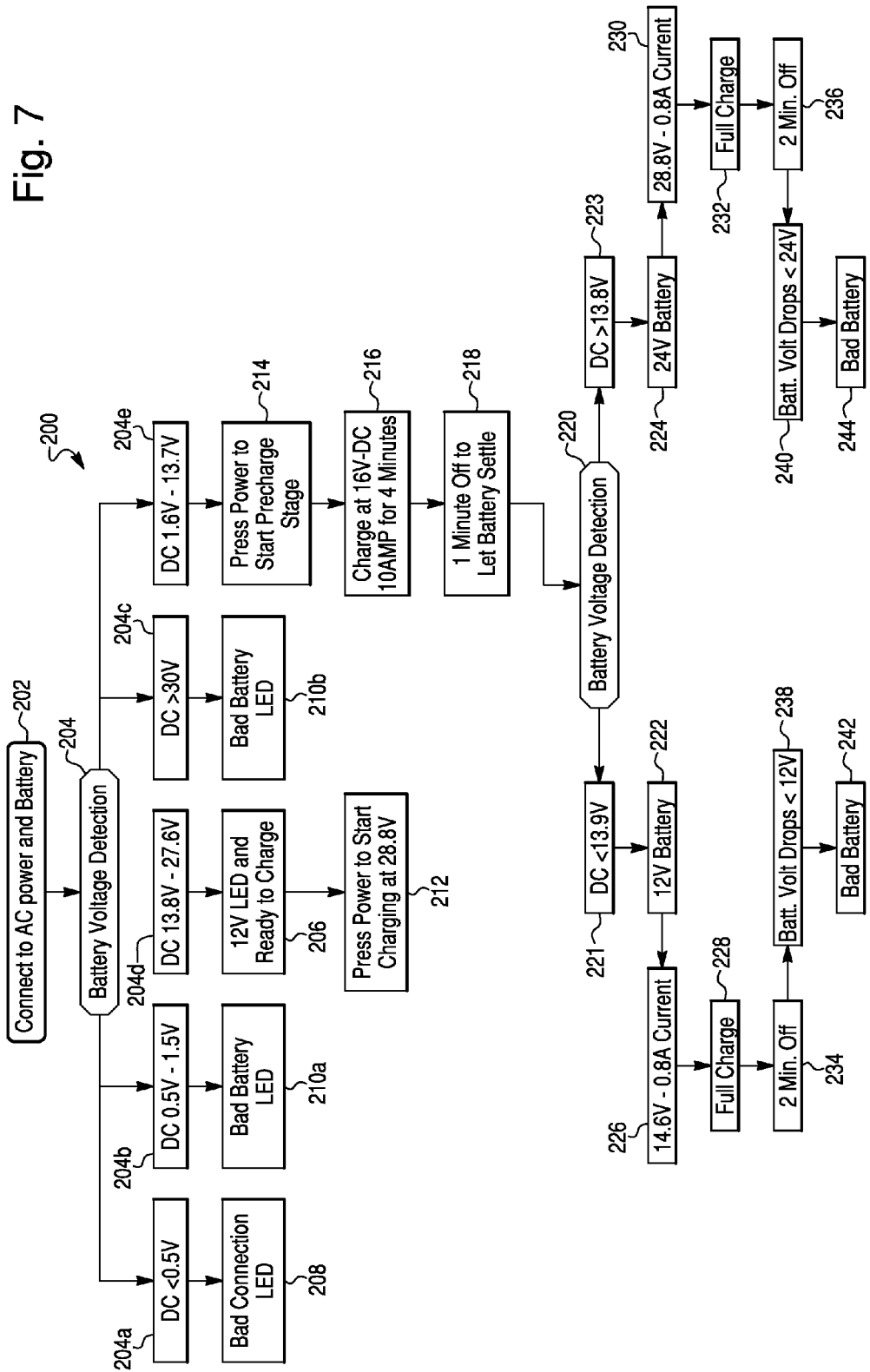

METHOD AND DEVICE FOR VOLTAGE DETECTION AND CHARGING OF ELECTRIC BATTERY

BACKGROUND OF THE INVENTION

1. Field of the Invention

The present invention is related to battery chargers in general, and more specifically to a method and device for rated voltage detection and charging of an electric battery.

2. Description of the Prior Art

Conventional methods for battery charging are cumbersome, time-consuming, and error-prone. Current battery chargers capable of charging batteries of different voltages, require users to manually select a rated (or nominal) voltage of the battery to be charged in order for the battery to be properly charged, and not damaged by the charging process. If a user selects a wrong battery rated voltage, the battery may not be properly charged, and the battery and/or the charger may be permanently damaged.

Manual selection of the battery voltage, however, is subject to the user actually knowing the proper battery voltage rating, and correctly selecting the voltage rating on the battery charger itself. Because rechargeable batteries can have different voltage ratings, even among batteries with the same form factor, the voltage rating of a specific battery may not be obvious to a user. Furthermore, physically selecting a voltage rating on a battery charger may be hampered by environmental conditions, such as darkness or moisture, or deterioration of the controls on the battery charger itself.

With this in mind, a need exists to develop a charger that automatically detects the voltage of an electric battery that advances the art.

SUMMARY OF THE INVENTION

The present invention provides a novel device and method for rated voltage detection and charging of electric batteries, such as lead-acid batteries commonly used in cars, trucks and other motor vehicles.

According to one aspect of the present invention, a method is provided for rated voltage detection and charging of an electric battery. The rated voltage detection and charging method of the present invention comprises the following steps. First, the rated voltage detection and charging device is connected to a power source. Then, a terminal voltage of the electric battery is measured. The electric battery has a rated voltage, which could be either a first rated voltage or a second rated voltage, wherein the first rated voltage is less than said second rated voltage. Next, the measured terminal voltage is compared to a number of threshold voltages between a minimum threshold DC voltage $V_{MIN}$ and a maximum threshold DC voltage $V_{MAX}$. In the following step, a condition of the battery is determined based on a comparison of the terminal voltage to the threshold voltages. The condition of the battery is ready to charge or fault. If the determined condition of the battery is ready to charge, it is determined that the rated voltage of the battery is the second rated voltage. However, if the determined condition of the battery is neither ready to charge nor fault, then a pre-charge process is conducted. Following the pre-charge process, the rated voltage of the electric battery is determined based on a response to the pre-charge process. Next, the electric battery is charged according to the rated voltage determined in the preceding step.

According to another aspect of the invention, a device is provided for detecting a rated voltage of an electric battery and subsequent charging thereof. The rated voltage detection and charging device of the present invention comprises a battery charging unit and a voltage detection unit operatively connected to the battery charging unit. The voltage detection unit includes a microprocessor in communication with the battery charging unit and configured to determine a condition of the electric battery based on a comparison of a terminal voltage of the battery to a number of threshold voltages between a minimum threshold DC voltage $V_{MIN}$ and a maximum threshold DC voltage $V_{MAX}$ and a rated voltage of the electric battery based on a response to a pre-charge process. The condition of the electric battery is ready to charge or fault. The rated voltage of the electric battery is either a first rated voltage or a second rated voltage, wherein the first rated voltage is less than the second rated voltage. The pre-charge process is conducted if the determined condition of the electric battery is neither ready to charge nor fault. The voltage detection unit is further provided to activate the battery charging unit for charging the battery according to the determined rated voltage.

BRIEF DESCRIPTION OF THE DRAWINGS

Other objects and advantages of the invention will become apparent from a study of the following specification when viewed in light of the accompanying drawings, wherein:

FIG. 4 is a flowchart of a method for rated voltage detection and charging of the electric battery in accordance with the first exemplary embodiment of the present invention;

FIG. 7 is a flowchart of the method for rated voltage detection and charging of the electric battery in accordance with the second exemplary embodiment of the present invention;

DETAILED DESCRIPTION OF PREFERRED EMBODIMENTS

The preferred embodiments of the present invention will now be described with the reference to accompanying drawings.

Figure 1:
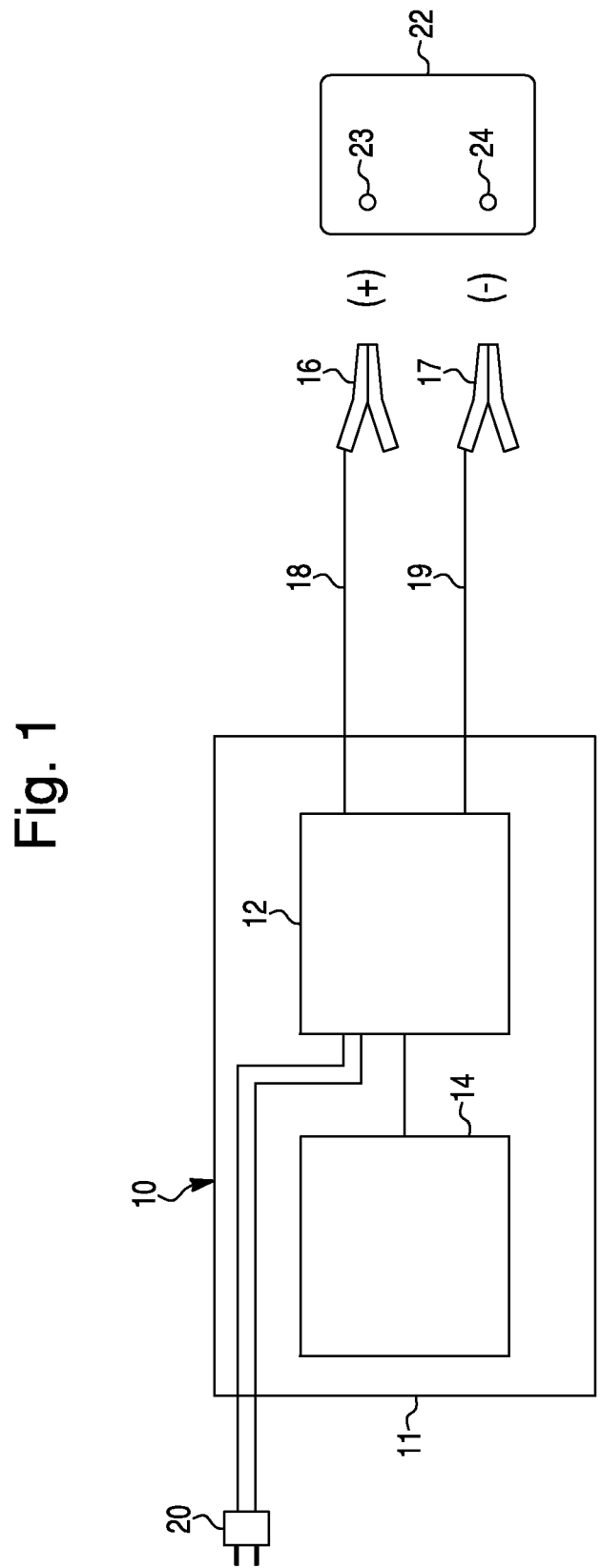
FIG. 1 is a schematic view of a device for rated voltage detection and charging of an electric battery in accordance with the present invention.

FIG. 1 of the drawings depicts a device, generally denoted by reference numeral 10, for rated voltage detection and charging of electric batteries, such as lead-acid batteries commonly used in cars, trucks and other motor vehicles, according to a first exemplary embodiment of the present invention.

The detection and charging device 10 comprises a battery charging unit 12, a voltage detection unit 14 operatively (electrically) connected the battery charging unit 12, positive and negative battery terminal clamps (electrical connectors) 16 and 17, respectively, connected to the battery charging unit 12 through positive and negative battery booster cables 18 and 19, respectively, and an electrical connector (AC input) 20 provided for selectively connecting the battery charging unit 12 of the device 10 to an AC (alternating current) power source, such as a conventional 120 volt circuit. The pair of the clamps 16 and 17 is provided for selectively conducting charging current from the battery charging unit to an electric battery 22. Conventionally, the positive clamp 16 is provided to be connected to a positive battery terminal 23, while the negative clamp 17 is provided to be connected to a negative battery terminal 24 of the electric battery 22. As further illustrated in FIG. 1, the battery charging unit 12 and the voltage detection unit 14 are housed within a casing 11.

The voltage detection unit 14 is provided to accomplish the following functions: 1) determine a condition of the battery 22 (which could be "ready-to-charge" or "fault") based on a comparison of a terminal voltage $V_T$ of the electric battery 22 to a number of threshold voltages between a minimum threshold DC voltage $V_{MIN}$ and a maximum threshold DC voltage $V_{MAX}$, conduct a pre-charge process if the determined condition of the battery 22 is neither "ready-to-charge" nor "fault", determine a rated (or nominal) voltage of the battery 22 based on a response to the pre-charge process, and activate the battery charging unit 12 for charging the battery 22 according to the determined rated voltage. The rated voltage of the battery 22 is one of a first rated voltage and a second rated voltage.

Those skilled in the art would understand that the rated (or nominal) voltage is one of the most important characteristics of an electric battery. Conventionally, in the lead-acid batteries, the rated voltage is a multiple of the 2 V individual cell voltage. It is well known in the art that the rated voltage is a voltage at which an electric battery is designed to operate, or, in other terms, the rated voltage is a voltage at which an electric battery capacity is rated. Typical rated voltage for motor vehicle electrical system batteries is 12 V for passenger cars and 24 V for commercial vehicles. In the past, the rated voltage for motor vehicle electrical system batteries used to be 6 V. Thus, many classic and/or collectors cars still use the electric batteries rated at 6 V.

The voltage detection/charging device 10, according to the present invention, is provided to determine a condition of the battery 22 based on a comparison of the terminal voltage $V_T$ of the electric battery 22 to a number of threshold voltages between a minimum threshold DC voltage $V_{MIN}$ and a maximum threshold DC voltage $V_{MAX}$, conduct a pre-charge process if a certain condition of the battery 22 is met, determine a rated voltage of the battery 22 based on a response to the pre-charge process, and activate the battery charging unit 12 for charging the battery 22 according to the determined rated voltage. According to the preferred embodiment of the present invention, the voltage detection and charging device 10 is provided to detect the rated voltage and charge the electric batteries with at least two different rated voltages, such as, for example, 6 V and 12 V or 12 V and 24 V.

Figure 2:
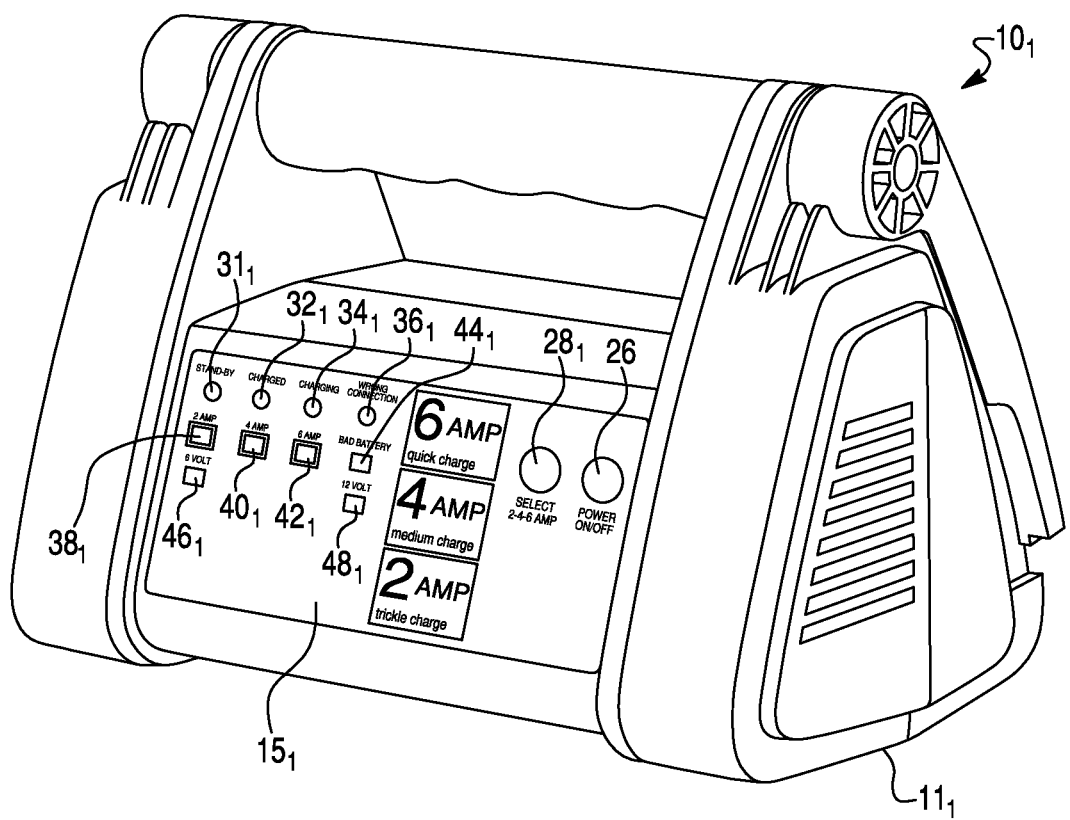
FIG. 2 is a perspective view of the device for rated voltage detection and charging of the electric battery in accordance with a first exemplary embodiment of the present invention.
Figure 3A:
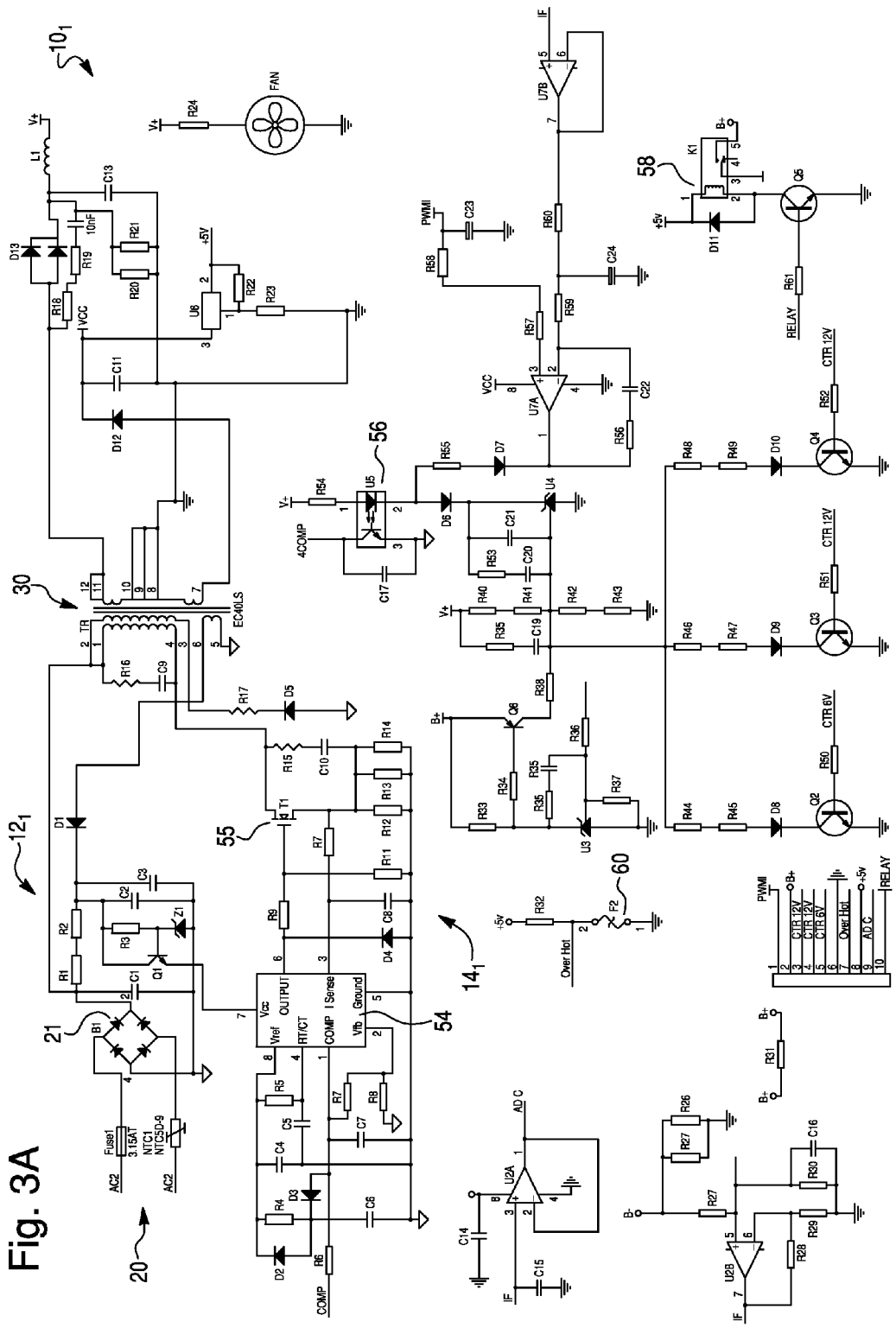
FIGS. 3A and 3B show an electric circuit diagram of the device in accordance with the first exemplary embodiment of the present invention.
Figure 3B:
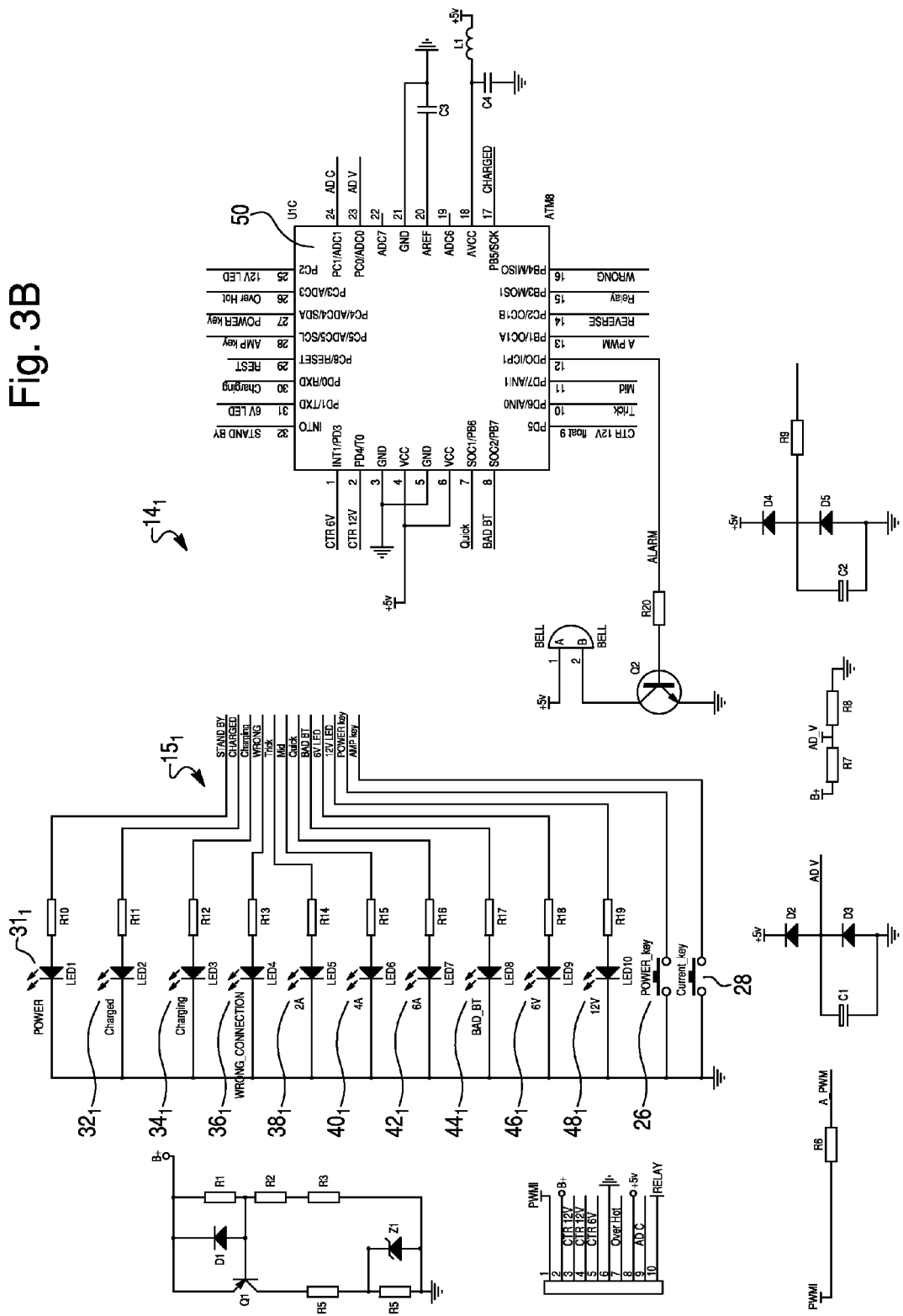

FIGS. 2, 3A and 3B illustrate a device $10_1$ for rated voltage detection and charging of electric batteries according to a first exemplary embodiment of the present invention. The detection and charging device (or detection/charging device) $10_1$ is provided for automatic voltage detection for batteries rated 6 or 12 volt. As illustrated in FIGS. 2-4, the detection/charging device $10_1$ comprises a casing $11_1$ housing a battery charging unit $12_1$ and a voltage detection unit $14_1$ operatively (electrically) connected the battery charging unit $12_1$, and includes a control panel $15_1$ provided with a number of control lights and push buttons. The voltage detection unit $14_1$ of the detection/charging device $10_1$ can be configured to automatically control some or all of the operation thereof. Various charging characteristics may be specified. As one example, different charging rates may be selected depending on a size of the battery 22 to be tested or charged.

The control panel $15_1$ of the detection/charging device $10_1$ includes a power on/off push button 26, a charge rate select ("Select 2/4/6 AMP") push button $28_1$, a Stand-by (or "Power") LED light $31_1$, a "Charged" LED light $32_1$, a "Charging" LED light $34_1$ and a "Wrong Connection" (or "Bad Connection") LED light $36_1$. The control panel $15_1$ of the detection/charging device $10_1$ further includes 2 AMP, 4 AMP and 6 AMP LED lights $38_1$, $40_1$ and $42_1$, respectively. Also, the control panel $15_1$ of the detection/charging device $10_1$ includes a "Bad Battery" LED light $44_1$, and "6 Volt" and "12 Volt" LED lights $46_1$ and $48_1$, respectively.

The detection/charging device $10_1$ has three charge rate settings for 12 Volt batteries: 2 A (Trickle Charge), 4 A (Medium Charge) and 6 A (Quick Charge) and one charge rate setting for 6 Volt batteries: 2 A (Trickle Charge), specified through the charge rate select push button $28_1$ depending on a size of the battery 22 to be tested and/or charged:

2 Amp (Trickle Charge) (for both 6 and 12V batteries): smaller batteries, as in lawn mowers, snowmobiles, motorcycles, etc.;

4 Amp (Medium Charge) (for 12V batteries only): mid-sized batteries, as in small cars; and 6 Amp (Quick Charge) (for 12V batteries only): large batteries, as in midsize to large automobiles and SUV's.

It will be appreciated that the specific charge rate setting is selected by repeatedly pressing the "Select 2/4/6 AMP" push button $28_1$ until the corresponding 2 AMP, 4 AMP or 6 AMP LED light, $38_1$, $40_1$ or $42_1$, is illuminated.

FIGS. 3A and 3B illustrate an electric circuit diagram of the voltage detection/charging device $10_1$. As noted above, the detection/charging device $10_1$ is configured to automatically control some or all of the operation of the battery charging unit $12_1$. Alternatively, different charging rates, such as low, medium and high, may be manually selected.

The voltage detection unit $14_1$ of the detection/charging device $10_1$ is provided to monitor the battery status (i.e. configured to monitor various characteristics of the battery 22), such as the battery voltage and battery current. The voltage detection unit $14_1$ may monitor characteristics of the battery in real time, and report the condition and/or characteristics of the battery 22 on the control panel $15_1$. By continuously monitoring one or more characteristics of the battery 22, the detection/charging device $10_1$ may also control for various charging errors, such as short circuit, overload, overheat, reverse connection, etc. The battery charging unit $12_1$ provided to charge the battery 22 produces a full waved rectified voltage. The battery charging unit $12_1$ includes the AC input 20, a bridge type rectifier 21 configured to convert the AC voltage to full wave DC voltage, and a transformer 30. The transformer 30 is selectively connected to the terminals 23, 24 of the battery 22 through the positive and negative battery booster cables 18 and 19. In the case of standard U.S. household current the frequency of the voltage is 60 Hz.

The voltage detection unit $14_1$ includes an electronic control unit (ECU) in the form of a microprocessor (MCU) 50, shown in FIG. 3B. The microprocessor 50 is configured to control proper operation and fault detection of the detection/charging device $10_1$ and to monitor a plurality of characteristics of the battery 22, including a terminal voltage $V_T$ of the electric battery 22 and a current supplied by the battery 22. Those skilled in the art would understand that the term "terminal voltage" is conventionally known in the art as a voltage measured at battery terminals. The terminal voltage of a battery can be measured as an indication of state of charge of the battery. Moreover, the microprocessor (MCU) 50 further controls charging current, charging voltage, charging time, LED light status, etc.

The voltage detection unit $14_1$ also includes an integrated circuit (IC) 54 provided to control a MOSFET 55 and the output of the transformer 30, an optocoupler 56, a relay 58 and a 95° C. thermal protector 60.

The voltage detection/charging device $10_1$ is provided to determine a condition of the battery 22 based on a comparison of the terminal voltage $V_T$ of the electric battery 22 to a number of threshold voltages between a minimum threshold DC voltage $V_{MIN}$ and a maximum threshold DC voltage $V_{MAX}$, conduct a pre-charge process if a certain condition of the battery 22 is met, determine a rated voltage of the battery 22 based on a response to the pre-charge process, and activate the battery charging unit $12_1$ for charging the battery 22 according to the determined rated voltage. According to the first exemplary embodiment of the present invention, the voltage detection/charging device $10_1$ is provided to detect the rated voltage and charge the electric batteries with two different rated voltages: 6V and 12V.

FIG. 4 is a flowchart illustrates a method 100 for rated voltage detection and charging of the electric battery in accordance with the first exemplary embodiment of the present invention, which can be implemented by the voltage detection/charging device $10_1$. The first exemplary embodiment of the present invention relates to the device for voltage detection and charging of the electric batteries having two different rated voltages: 6 V (a first rated voltage) and 12 V (a second rated voltage).

In a first step 102, the voltage detection/charging device $10_1$ is connected the AC power source, such as a conventional 120 volt, 60 Hz circuit, through the electrical connector (AC input) 20. Moreover, in the first step 102, the voltage detection/charging device $10_1$ is connected to the electric battery 22 via the battery terminal clamps 16, 17 of the battery booster cables 18, 19.

After the initial step 102, the voltage detection/charging device $10_1$ goes on to a step 104 of detecting the rated voltage of the battery 22 by, first, measuring the terminal voltage $V_T$ of the electric battery 22, then comparing the terminal DC voltage to a number of threshold voltages between a minimum threshold DC voltage $V_{MIN}$ and a maximum threshold DC voltage $V_{MAX}$. Obviously, the maximum threshold DC voltage $V_{MAX}$ is larger than the minimum threshold DC voltage $V_{MIN}$ (i.e., $V_{MAX} > V_{MIN}$). Preferably, according to the first exemplary embodiment of the present invention, the minimum threshold DC voltage $V_{MIN}$ is 0.5 VDC (volts of direct current), while the maximum threshold DC voltage $V_{MAX}$ is 15 VDC. The threshold voltages, besides the minimum threshold DC voltage $V_{MIN}$ and the maximum threshold DC voltage $V_{MAX}$, are: a first threshold DC voltage $V_1$ (1.5 VDC according to the first exemplary embodiment of the present invention), a second threshold DC voltage $V_2$ (6.9 VDC according to the first exemplary embodiment of the present invention), and a third threshold DC voltage $V_3$ (13.8 VDC according to the first exemplary embodiment of the present invention).

Next, a condition of the electric battery 22 is determined by the microprocessor 50 of the voltage detection unit $14_1$ based on a comparison of the terminal voltage $V_T$ to the threshold voltages. The condition of the electric battery 22 determined by the voltage detection unit $14_1$ is one of "12V and ready-to-charge" 106 and "fault". In turn, the "fault" condition of the battery 22 may be "bad connection" 108 and "bad battery" (110a and 110b, or [110]). The term "bad battery" means that the electric battery cannot function as intended (for intended purposes). According to the first exemplary embodiment of the present invention, the "bad connection" condition 108 is determined by the voltage detection unit $14_1$ when the terminal voltage $V_T$ of the battery 22 is less than the minimum threshold DC voltage $V_{MIN}$ (i.e., when $V_T < V_{MIN}$) (the step 104a). In other words, according to the first exemplary embodiment of the present invention, the "bad connection" condition 108 is determined by the voltage detection unit $14_1$ when the terminal voltage $V_T$ of the battery 22 is less than 0.5 VDC (i.e., when $V_T < 0.5$ VDC). If the "bad connection" condition 108 is determined, the "Bad Connection" LED light $36_1$ is illuminated.

The "bad battery" condition [110] is determined when the terminal voltage $V_T$ of the electric battery 22 is equal or more than the minimum threshold DC voltage $V_{MIN}$ and equal or less than the first threshold DC voltage $V_1$ (i.e., when $V_{MIN} \leq V_T \leq V_1$) (step 104b, condition 110a), or when the terminal voltage of the battery is more than the maximum threshold DC voltage $V_{MAX}$ (i.e., when $V_T > V_{MAX}$) (step 104c, condition 110b). In other words, according to the first exemplary embodiment of the present invention, the "bad battery" condition [110] is determined by the voltage detection unit $14_1$ when the terminal voltage $V_T$ of the battery 22 is between equal or more than 0.5 VDC and equal or less than 1.5 VDC (i.e., when 0.5 VDC $\leq V_T \leq$ 1.5 VDC) (step 104b, condition 110a), or when the terminal voltage of the battery is more than 15 VDC (i.e., when $V_T > 15$ VDC) (step 104c, condition 110b). If the "bad battery" condition [110] is determined, the "Bad Battery" LED light $44_1$ is illuminated.

The "12V and ready-to-charge" condition 106 is determined by the microprocessor 50 when the terminal voltage $V_T$ of the electric battery 22 is equal or more than the second threshold DC voltage $V_2$ and equal or less than the third threshold DC voltage $V_3$ (i.e., when $V_2 \leq V_T \leq V_3$) (step 104d). In other words, according to the first exemplary embodiment of the present invention, the "12V and ready-to-charge" condition is determined by the voltage detection unit $14_1$ when the terminal voltage $V_T$ of the battery 22 is equal or more than 6.9 VDC and equal or less than 13.8 VDC (i.e., when 6.9 VDC $\leq V_T \leq$ 13.8 VDC, or when the terminal voltage $V_T$ is in the range 6.9 VDC-13.8 VDC) (step 104d). Moreover, when the microprocessor 50 of the voltage detection unit $14_1$ determines that a battery condition is "12V and ready-to-charge" (i.e., when the terminal voltage $V_T$ is in the range 6.9 VDC-13.8 VDC), then the microprocessor 50 determines that the electric battery 22 is rated at 12 V. Consequently, the "12 V" LED lamp $48_1$ is illuminated on the control panel $15_1$ of the voltage detection/charging device $10_1$, and charging of the electric battery 22 is initiated at the step 112 by pressing the power push button 26 by the user and, consequently, by the battery charging unit $12_1$ at a charging DC voltage equal to 14.6 VDC according to the first exemplary embodiment of the present invention.

However, if the condition of the electric battery 22 determined by the microprocessor 50 is neither "ready-to-charge" nor "fault", both the "6 Volt" and "12 Volt" LED lights $46_1$ and $48_1$ will flash, thus indicating that a pre-charge process needs to be conducted. In response, the user presses the power button 26 (the step 114) to initiate the pre-charge process. In other words, the step of conducting the pre-charge process is initiated when the terminal voltage $V_T$ of the electric battery 22 is more than the first threshold DC voltage $V_1$ and less than the second threshold DC voltage $V_2$ (the step 104e). According to the first exemplary embodiment of the present invention, the step of conducting a pre-charge process is initiated when the terminal voltage $V_T$ of the electric battery 22 is more than 1.6 VDC and less than 6.8 (i.e., when 1.5 VDC<$V_T$<6.9 VDC, or when the terminal voltage $V_T$ is in the range 1.6 VDC-6.8 VDC).

During the step 116 of the pre-charge process, the electric battery 22 is pre-charged for a first predetermined period of time by a pre-charge DC current $I_{PRE}$ at a pre-charge DC voltage $V_{PRE}$, which is less than $V_{MAX}$ and higher than $V_{MIN}$. As noted above, according to the first exemplary embodiment of the present invention, the pre-charge current $I_{PRE}$ is 6 A. Specifically, the voltage detection/charging device $10_1$ of the first exemplary embodiment of the present invention includes the three LED lights $38_1$, $40_1$ and $42_1$ provided on the control panel $15_1$ of the voltage detection/charging device $10_1$ for displaying three different charge rate settings: 2 A, 4 A and 6 A, respectively. The 2 A charge rate setting is provided for smaller batteries rated 6 V or 12 V, such as batteries for lawn mowers, snowmobiles, motorcycles, etc. The 4 A charge rate setting is provided for mid-sized batteries rated 12 V, such as in small cars. The 6 A charge rate setting is provided for mid-sized batteries rated 12 V, such as in medium and full-sized cars, SUVs, trucks, etc. The user manually selects the charge rate setting prior to the pre-charge process by pressing the charge rate select ("Select 2/4/6 AMP") button $28_1$ depending on the size of the electric battery 22 and the desired rate of charging. In the exemplary embodiment of FIG. 4, the user selects the 6 AMP charge rate for quick charge with the pre-charge DC current $I_{PRE}$ of 6 A. The pre-charge process is initiated by pressing the power button 26 on the control panel $15_1$ of the voltage detection/charging device $10_1$ depending on a size of the battery 22 to be tested and/or charged and the desired rate of charging. According to the first exemplary embodiment of the present invention, the pre-charge DC current $I_{PRE}$ is 6 A and the pre-charge voltage $V_{PRE}$ is 8 VDC, while the first predetermined period of time is 4 minutes.

Following the step 116 of pre-charging the battery at the pre-charge DC voltage $V_{PRE}$ for the first predetermined period of time by the pre-charge DC current $I_{PRE}$, the pre-charge process ends with the step 118 of stopping the pre-charge process for a second predetermined period of time in order to allow the battery 22 to settle. According to the first exemplary embodiment of the present invention, the second predetermined period of time is 1 minute.

Next, a rated voltage of the electric battery 22 is determined (the step 120) by the microprocessor 50 of the voltage detection unit $14_1$ based on a response to the pre-charge process, which includes the steps 114, 116 and 118. As noted above, the rated voltage of the electric battery 22 according to the first exemplary embodiment of the present invention could be 6 V (the first rated voltage) or 12 V (the second rated voltage). In turn, the step 120 of determining the rated voltage of the electric battery 22, executed following the pre-charge process (steps 114, 116 and 118), includes the following steps. First, the terminal voltage $V_T$ of the electric battery 22 is measured by the voltage detection unit $14_1$ following the pre-charge process. Then, the voltage detection unit $14_1$ determines that the electric battery 22 has the first rated voltage (6 V) (the step 122) if the terminal voltage $V_T$ of the electric battery 22 after the pre-charge process is less than the second threshold DC voltage $V_2$ (the step 121). In other words, if $V_T$<6.9 VDC (the step 121), then it is determined that the electric battery 22 is rated 6 V (the step 122). Consequently, the "6 V" LED lamp $46_1$ is illuminated on the control panel $15_1$ of the voltage detection/charging device $10_1$.

Similarly, if the terminal voltage $V_T$ of the electric battery 22 after the pre-charge process is equal or more than the second threshold DC voltage $V_2$ (the step 123), then the voltage detection unit $14_1$ determines that the electric battery 22 has the second rated voltage (12 V) (the step 124). In other words, if $V_T$>6.8 VDC (the step 123), then it is determined that the electric battery 22 is rated 12 V (the step 124). Consequently, the "12 V" LED lamp $48_1$ is illuminated on the control panel $15_1$ of the voltage detection/charging device $10_1$.

Subsequently, the electric battery 22 is charged by the battery charging unit $12_1$ according to the determined voltage rating. More specifically, the electric battery 22 is charged at a first charging DC voltage $V_{CH1}$ by a first charging current $I_{CH1}$ (the step 126) until fully charged (the step 128) if the battery 22 is determined to have the first rated voltage (6 V) (in the step 122), and at a second charging DC voltage $V_{CH2}$ by a second charging current $I_{CH2}$ (the step 130) until fully charged (the step 132) if the battery 22 is determined to have the second rated voltage (12 V) (in the step 124). According to the first exemplary embodiment of the present invention, the first charging DC voltage $V_{CH1}$ is 7.3 VDC, the first charging current $I_{CH1}$ is 0.8 A, the second charging DC voltage $V_{CH2}$ is 14.6 VDC and the second charging current $I_{CH2}$ is 0.8 A.

When the battery 22 is fully charged at the step 128 or 132 (depending on the determined battery voltage rating), the full charge process ends with the step 134 or 136 of stopping the charging process for a third predetermined period of time in order to allow the battery 22 to settle. According to the first exemplary embodiment of the present invention, the third predetermined period of time is 2 minutes.

After the third predetermined period of time expires, the condition of the electric battery 22 is again determined by the microprocessor 50 based on a comparison of the terminal voltage $V_T$ to the first rated voltage (6 V) (if the battery 22 is determined (in the step 122) to have the first rated voltage) in the step 138 or to the second rated voltage (12 V) (if the battery 22 is determined (in the step 124) to have the second rated voltage) in the step 140. The "bad battery" condition is determined by the voltage detection unit $14_1$ when the terminal voltage $V_T$ of the battery 22 is less than the first rated voltage (6 V) (i.e., when $V_T$<6 VDC) if the battery 22 is rated 6 V (the step 142). Similarly, the "bad battery" condition is determined by the voltage detection unit $14_1$ when the terminal voltage $V_T$ of the battery 22 is less than the second rated voltage (12 V) (i.e., when $V_T$<12 VDC) if the battery 22 is rated 12 V (the step 144).

Figure 5:
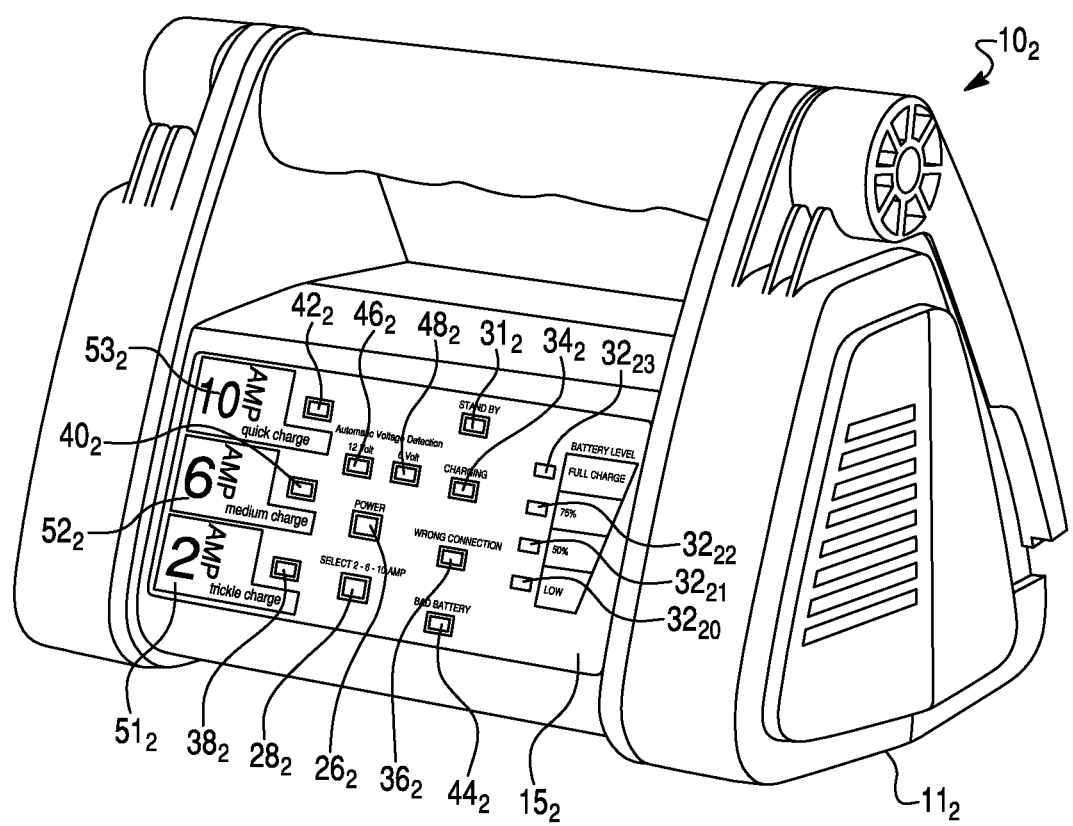
FIG. 5 is a perspective view of the device for rated voltage detection and charging of the electric battery in accordance with a second exemplary embodiment of the present invention.
Figure 6:
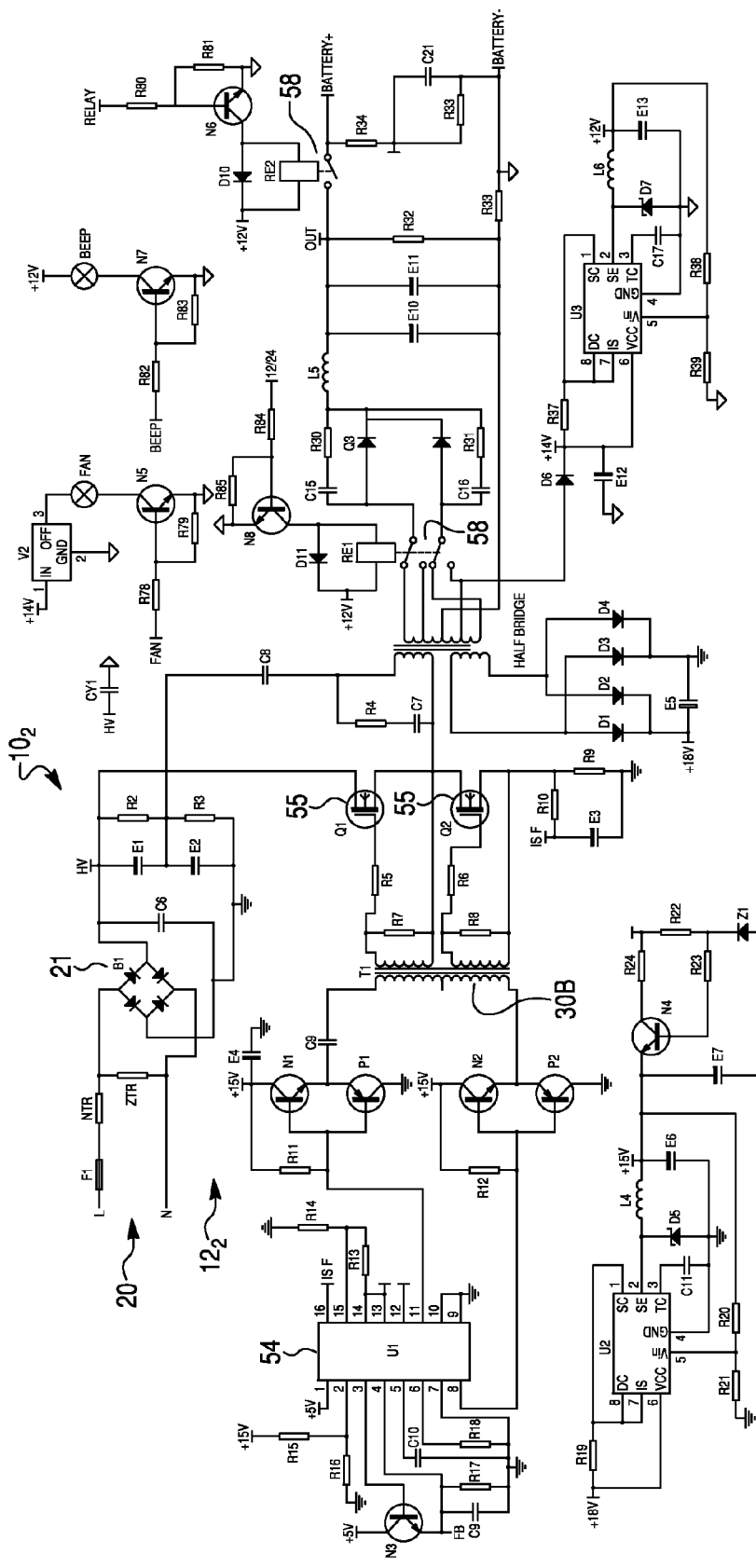
FIG. 6 is an electric circuit diagram of the device in accordance with the second exemplary embodiment of the present invention.

FIGS. 5 and 6 illustrate a device $10_2$ for rated voltage detection and charging of electric batteries according to a second exemplary embodiment of the present invention. Components, which are unchanged from the previous exemplary embodiment of the present invention, are labeled with the same reference characters. Components, which function in the same way as in the first exemplary embodiment of the present invention depicted in FIGS. 1-4 are designated by the same reference numerals to which the subscript 2 or 100 has been added, sometimes without being described in detail since similarities between the corresponding parts in the two embodiments will be readily perceived by the reader.

The detection and charging device (or detection/charging device) $10_2$ is provided for automatic voltage detection for batteries rated 12 or 24 volt. As illustrated in FIG. 5, the detection/charging device $10_2$ comprises a casing $11_2$ housing a battery charging unit $12_2$ and a voltage detection unit $14_2$ operatively (electrically) connected the battery charging unit $12_2$, and includes a control panel $15_2$ provided with a number of control lights and push buttons. The voltage detection unit $14_2$ of the detection/charging device $10_2$ can be configured to automatically control some or all of the operation thereof. Various charging characteristics may be specified. As one example, different charging rates may be selected depending on a size of the battery 22 to be tested or charged.

The control panel $15_2$ of the detection/charging device $10_2$ includes a power on/off push button 26, a charge rate select ("Select 2/6/10 AMP") push button $28_2$, a Stand-by (or power) LED light $31_2$, a "Charging" LED light $34_2$ and a "Wrong Connection" (or "Bad Connection") LED light $36_2$. The control panel $15_2$ of the detection/charging device $10_2$ further includes a set of LED light indicating a battery charge level, specifically: a "Low Charge" LED light $32_{20}$, a "50% Charge" LED light $32_{21}$, a "75% Charge" LED light $32_{22}$ and a "Full Charge" LED light $32_{23}$. The control panel $15_2$ of the detection/charging device $10_2$ also includes 2 AMP, 6 AMP and 10 AMP LED lights $38_2$, $40_2$ and $42_2$, respectively. Also, the control panel $15_2$ of the detection/charging device $10_2$ includes a "Bad Battery" LED light $44_2$, and "12 Volt" and "24 Volt" LED lights $46_2$ and $48_2$, respectively.

The detection/charging device $10_2$ has three charge rate settings for 12 and 24 Volt batteries: 2 A (Trickle Charge), 6 A (Medium Charge) and 6 10 (Quick Charge), specified through the charge rate select push button $28_2$ depending on a size of the battery 22 to be tested and/or charged:

2 Amp (Trickle Charge) (for both 12V and 24V batteries): smaller batteries, as in lawn mowers, snowmobiles, motorcycles, etc.;

6 Amp (Medium Charge) (for both 12V and 24V batteries): mid-sized batteries, as in small cars; and 10 Amp (Quick Charge) (for 12V batteries only): large batteries, as in midsize to large automobiles and SUV's.

FIG. 6 illustrates an electric circuit diagram of the voltage detection/charging device $10_2$. As noted above, the detection/charging device $10_2$ is configured to automatically control some or all of the operation of the battery charging unit $12_2$. Alternatively, different charging rates, such as low, medium and high, may be manually selected.

The voltage detection unit $14_2$ of the detection/charging device $10_2$ is provided to monitor the battery status (i.e. configured to monitor various characteristics of the battery 22), such as the battery voltage and battery current. The voltage detection unit $14_2$ may monitor characteristics of the battery in real time, and report the condition and/or characteristics of the battery 22 on the control panel $15_2$. By continuously monitoring one or more characteristics of the battery 22, the detection/charging device $10_2$ may also control for various charging errors, such as short circuit, overload, overheat, reverse connection, etc. The battery charging unit $12_2$ provided to charge the battery 22 produces a full waved rectified voltage. The battery charging unit $12_2$ includes the AC input 20, a bridge type rectifier 21 configured to convert the AC voltage to full wave DC voltage, a main transformer 30a and an auxiliary transformer 30b, and MOSFETs 55. The main transformer 30a is selectively connected to the terminals 23, 24 of the battery 22 through the positive and negative battery booster cables 18 and 19. In the case of standard U.S. household current the frequency of the voltage is 60 Hz. The auxiliary transformer 30b drives the MOSFETs 55 and controls the operation of the main transformer 30a.

The voltage detection unit $14_2$ includes an electronic control unit (ECU) in the form of a microprocessor (MCU) 50, shown in FIG. 6. The microprocessor 50 is configured to control proper operation and fault detection of the detection/charging device $10_2$ and to monitor a plurality of characteristics of the battery 22, including a terminal voltage $V_T$ of the electric battery 22 and a current supplied by the battery 22. Those skilled in the art would understand that the term "terminal voltage" is conventionally known in the art as a voltage measured at battery terminals. The terminal voltage of a battery can be measured as an indication of state of charge of the battery. Moreover, the microprocessor (MCU) 50 further controls charging current, charging voltage, charging time, LED light status, etc.

The voltage detection unit $14_2$ also includes an integrated circuit (IC) 54 provided to control the MOSFETs 55 and the output of the auxiliary transformer 30b, an optocoupler 56, and relays 58.

The voltage detection/charging device $10_2$ is provided to determine a condition of the battery 22 based on a comparison of the terminal voltage $V_T$ of the electric battery 22 to a number of threshold voltages between a minimum threshold DC voltage $V_{MIN}$ and a maximum threshold DC voltage $V_{MAX}$, conduct a pre-charge process if a certain condition of the battery 22 is met, determine a rated voltage of the battery 22 based on a response to the pre-charge process, and activate the battery charging unit $12_2$ for charging the battery 22 according to the determined rated voltage. According to the second exemplary embodiment of the present invention, the voltage detection/charging device $10_2$ is provided to detect the rated voltage and charge the electric batteries with two different rated voltages: 12V and 24V.

FIG. 7 is a flowchart illustrates a method 200 for rated voltage detection and charging of the electric battery in accordance with the second exemplary embodiment of the present invention, which can be implemented by the voltage detection/charging device $10_2$. The second exemplary embodiment of the present invention relates to the device for voltage detection and charging of the electric batteries having two different rated voltages: 12 V (a first rated voltage) and 24 V (a second rated voltage).

In a first step 202, the voltage detection/charging device $10_2$ is connected the AC power source, such as a conventional 120 volt, 60 Hz circuit, through the electrical connector (AC input) 20. Moreover, in the first step 202, the voltage detection/charging device $10_2$ is connected to the electric battery 22 via the battery terminal clamps 16, 17 of the battery booster cables 18, 19.

After the initial step 202, the voltage detection/charging device $10_2$ goes on to a step 204 of detecting the rated voltage of the battery 22 by, first, measuring the terminal voltage $V_T$ of the electric battery 22, then comparing the terminal DC voltage to a number of threshold voltages between a minimum threshold DC voltage $V_{MIN}$ and a maximum threshold DC voltage $V_{MAX}$. Obviously, the maximum threshold DC voltage $V_{MAX}$ is larger than the minimum threshold DC voltage $V_{MIN}$ (i.e., $V_{MAX} > V_{MIN}$). Preferably, according to the second exemplary embodiment of the present invention, the minimum threshold DC voltage $V_{MIN}$ is 0.5 VDC (volts of direct current), while the maximum threshold DC voltage $V_{MAX}$ is 30 VDC. The threshold voltages, besides the minimum threshold DC voltage $V_{MIN}$ and the maximum threshold DC voltage $V_{MAX}$, are: a first threshold DC voltage $V_1$ (1.5 VDC according to the second exemplary embodiment of the present invention), a second threshold DC voltage $V_2$ (13.8 VDC according to the second exemplary embodiment of the present invention), and a third threshold DC voltage $V_3$ (27.6 VDC according to the second exemplary embodiment of the present invention).

Next, a condition of the electric battery 22 is determined by the microprocessor 50 of the voltage detection unit $14_2$ based on a comparison of the terminal voltage $V_T$ to the threshold voltages. The condition of the electric battery 22 determined by the voltage detection unit $14_2$ is one of "24V and ready-to-charge" 206 and "fault". In turn, the "fault" condition of the battery 22 may be "bad connection" 208 and "bad battery" (210a and 210b, or [210]). The term "bad battery" means that the electric battery cannot function as intended (for intended purposes). According to the second exemplary embodiment of the present invention, the "bad connection" condition 208 is determined by the voltage detection unit $14_2$ when the terminal voltage $V_T$ of the battery 22 is less than the minimum threshold DC voltage $V_{MIN}$ (i.e., when $V_T<V_{MIN}$) (the step 204a). In other words, according to the first exemplary embodiment of the present invention, the "bad connection" condition 208 is determined by the voltage detection unit $14_2$ when the terminal voltage $V_T$ of the battery 22 is less than 0.5 VDC (i.e., when $V_T<0.5$ VDC). If the "bad connection" condition 208 is determined, the "Bad Connection" LED light $36_2$ is illuminated.

The "bad battery" condition [210] is determined when the terminal voltage $V_T$ of the electric battery 22 is equal or more than the minimum threshold DC voltage $V_{MIN}$ and equal or less than the first threshold DC voltage $V_1$ (i.e., when $V_{MIN} \le V_T \le V_1$) (step 204b, condition 210a), or when the terminal voltage of the battery is more than the maximum threshold DC voltage $V_{MAX}$ (i.e., when $V_T > V_{MAX}$) (step 204c, condition 210b). In other words, according to the first exemplary embodiment of the present invention, the "bad battery" condition [210] is determined by the voltage detection unit $14_1$ when the terminal voltage $V_T$ of the battery 22 is between equal or more than 0.5 VDC and equal or less than 1.5 VDC (i.e., when 0.5 VDC $\le V_T \le$ 1.5 VDC) (step 204b, condition 210a), or when the terminal voltage of the battery is more than 30 VDC (i.e., when $V_T>30$ VDC) (step 204c, condition 210b). If the "bad battery" condition [210] is determined, the "Bad Battery" LED light $44_2$ is illuminated.

The "24V and ready-to-charge" condition 206 is determined by the microprocessor 50 when the terminal voltage $V_T$ of the electric battery 22 is equal or more than the second threshold DC voltage $V_2$ and equal or less than the third threshold DC voltage $V_3$ (i.e., when $V_2 \le V_T \le V_3$) (step 204d). In other words, according to the second exemplary embodiment of the present invention, the "24V and ready-to-charge" condition (206) is determined by the voltage detection unit $14_2$ when the terminal voltage $V_T$ of the battery 22 is equal or more than 13.8 VDC and equal or less than 27.6 VDC (i.e., when 13.8 VDC $\le V_T \le$ 27.6 VDC, or when the terminal voltage $V_T$ is in the range 13.8 VDC-27.6 VDC) (step 204d). Moreover, when the microprocessor 50 of the voltage detection unit $14_2$ determines that a battery condition is "24V and ready-to-charge" (i.e., when the terminal voltage $V_T$ is in the range 13.8 VDC-27.6 VDC), then the microprocessor 50 determines that the electric battery 22 is rated at 24 V. Consequently, the "24 V" LED lamp $48_2$ is illuminated on the control panel $15_2$ of the voltage detection/charging device $10_2$, and charging of the electric battery 22 is initiated at the step 212 by pressing the power push button 26 by the user and, consequently, by the battery charging unit $12_2$ at a charging DC voltage equal to 28.8 VDC according to the second exemplary embodiment of the present invention.

However, if the condition of the electric battery 22 determined by the microprocessor 50 is neither "ready-to-charge" nor "fault", both the "12 Volt" and "24 Volt" LED lights $46_2$ and $48_2$ will flash, thus indicating that a pre-charge process needs to be conducted. In response, the user presses the power button 26 (the step 214) to initiate the pre-charge process. In other words, the step of conducting a pre-charge process is initiated when the terminal voltage $V_T$ of the electric battery 22 is more than the first threshold DC voltage $V_1$ and less than the second threshold DC voltage $V_2$ (the step 204e). According to the second exemplary embodiment of the present invention, the step of conducting a pre-charge process is initiated when the terminal voltage $V_T$ of the electric battery 22 is more than 1.6 VDC and less than 13.7 (i.e., when 1.5 VDC $<V_T<$ 13.8 VDC, or when the terminal voltage $V_T$ is in the range 1.6 VDC-13.7 VDC).

During the step 216 of the pre-charge process, the electric battery 22 is pre-charged for a first predetermined period of time by a pre-charge DC current $I_{PRE}$ at a pre-charge DC voltage $V_{PRE}$, which is less than $V_{MAX}$ and higher than $V_{MIN}$. As noted above, according to the first exemplary embodiment of the present invention, the pre-charge current $I_{PRE}$ is one of 2 A, 6 A and 10 A. Also, the voltage detection/charging device $10_2$ of the second exemplary embodiment of the present invention is provided with 2 AMP, 6 AMP and 10 AMP LED lights $38_2$, $40_2$ and $42_2$, respectively, provided on the control panel $15_2$ of the voltage detection/charging device $10_2$, for displaying three different charge rate settings: 2 A, 6 A and 10 A, respectively. The 2 A charge rate setting is provided for smaller batteries rated 12 V or 24 V, such as batteries for lawn mowers, snowmobiles, motorcycles, etc. The 6 A charge rate setting is provided for mid-sized batteries also rated 12 V or 24 V, such as in small cars. The 10 A charge rate setting is provided for mid-sized batteries rated 12 V, such as in medium and full-sized cars, SUVs, trucks, etc.

The user manually selects the charge rate setting prior to the pre-charge process by pressing the charge rate select ("Select 2/6/10 AMP") button $28_2$ depending on the size of the electric battery 22 and the desired rate of charging. In the second exemplary embodiment of the present invention of FIG. 7, the user selects the 10 AMP charge rate for quick charge with the pre-charge DC current $I_{PRE}$ of 10 A. The pre-charge process is initiated by pressing the power button 26 on the control panel $15_2$ of the voltage detection/charging device $10_2$ depending on a size of the battery 22 to be tested and/or charged and the desired rate of charging. According to the second exemplary embodiment of the present invention, the pre-charge DC current $I_{PRE}$ is 10 A and the pre-charge voltage $V_{PRE}$ is 16 VDC, while the first predetermined period of time is 4 minutes.

Following the step 216 of pre-charging the battery at the pre-charge DC voltage $V_{PRE}$ for the first predetermined period of time by the pre-charge DC current $I_{PRE}$, the pre-charge process ends with the step 218 of stopping the pre-charge process for a second predetermined period of time in order to allow the battery 22 to settle. According to the second exemplary embodiment of the present invention, the second predetermined period of time is 1 minute.

Next, a rated voltage of the electric battery 22 is determined (the step 220) by the microprocessor 50 of the voltage detection unit $14_2$ based on a response to the pre-charge process, which includes the steps 214, 216 and 218. As noted above, the rated voltage of the electric battery 22 according to the second exemplary embodiment of the present invention could be 12 V (the first rated voltage) or 24 V (the second rated voltage). In turn, the step 220 of determining the rated voltage of the electric battery 22, executed following the pre-charge process (steps 214, 216 and 218), includes the following steps. First, the terminal voltage $V_T$ of the electric battery 22 is measured by the voltage detection unit $14_2$ following the pre-charge process. Then, the voltage detection unit $14_2$ determines that the electric battery 22 has the first rated voltage (12 V) (the step 222) if the terminal voltage $V_T$ of the electric battery 22 after the pre-charge process is less than the second threshold DC voltage $V_2$ (the step 221). In other words, if $V_T$<13.9 VDC (the step 221), then it is determined that the electric battery 22 is rated 12 V (the step 222). Consequently, the "12 V" LED lamp $46_2$ is illuminated on the control panel $15_2$ of the voltage detection/charging device $10_2$.

Similarly, if the terminal voltage $V_T$ of the electric battery 22 after the pre-charge process is equal or more than the second threshold DC voltage $V_2$ (the step 223), then the voltage detection unit $14_2$ determines that the electric battery 22 has the second rated voltage (24 V) (the step 224). In other words, if $V_T$>13.8 VDC (the step 223), then it is determined that the electric battery 22 is rated 24 V (the step 224). Consequently, the "24 V" LED lamp $48_2$ is illuminated on the control panel $15_2$ of the voltage detection/charging device $10_2$.

Subsequently, the electric battery 22 is charged by the battery charging unit $12_2$ according to the determined voltage rating. More specifically, the electric battery 22 is charged at a first charging DC voltage $V_{CH1}$ by a first charging current $I_{CH1}$ (the step 226) until fully charged (the step 228) if the battery 22 is determined to have the first rated voltage (12 V) (in the step 222), and at a second charging DC voltage $V_{CH2}$ by a second charging current $I_{CH2}$ (the step 230) until fully charged (the step 232) if the battery 22 is determined to have the second rated voltage (24 V) (in the step 224). According to the second exemplary embodiment of the present invention, the first charging DC voltage $V_{CH1}$ is 14.6 VDC, the first charging current $I_{CH1}$ is 0.8 A, the second charging DC voltage $V_{CH2}$ is 28.8 VDC and the second charging current $I_{CH2}$ is 0.8 A.

When the battery 22 is fully charged at the step 228 or 232 (depending on the determined battery voltage rating), the full charge process ends with the step 234 or 236 of stopping the charging process for a third predetermined period of time in order to allow the battery 22 to settle. According to the first exemplary embodiment of the present invention, the third predetermined period of time is 2 minutes.

After the third predetermined period of time expires, the condition of the electric battery 22 is again determined by the microprocessor 50 based on a comparison of the terminal voltage $V_T$ to the first rated voltage (12 V) (if the battery 22 is determined (in the step 222) to have the first rated voltage) in the step 238 or to the second rated voltage (24 V) (if the battery 22 is determined (in the step 224) to have the second rated voltage) in the step 240. The "bad battery" condition is determined by the voltage detection unit $14_2$ when the terminal voltage $V_T$ of the battery 22 is less than the first rated voltage (12 V) (i.e., when $V_T$<12 VDC) if the battery 22 is rated 12 V (the step 242). Similarly, the "bad battery" condition is determined by the voltage detection unit $14_2$ when the terminal voltage $V_T$ of the battery 22 is less than the second rated voltage (24 V) (i.e., when $V_T$<24 VDC) if the battery 22 is rated 24 V (the step 244).

Figure 8:
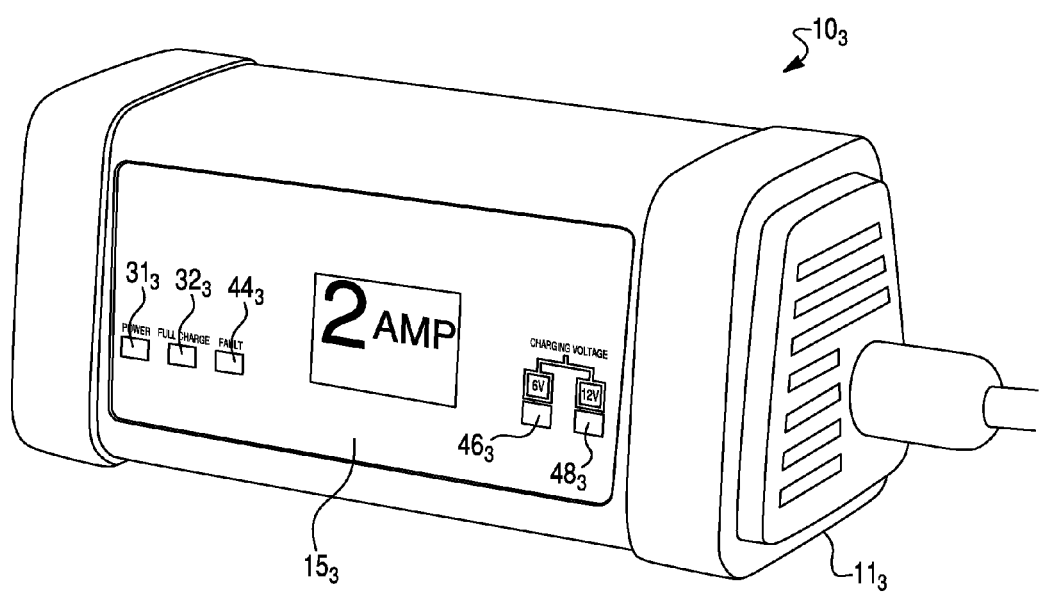
FIG. 8 is a perspective view of the device for rated voltage detection and charging of the electric battery in accordance with a third exemplary embodiment of the present invention.
Figure 9:
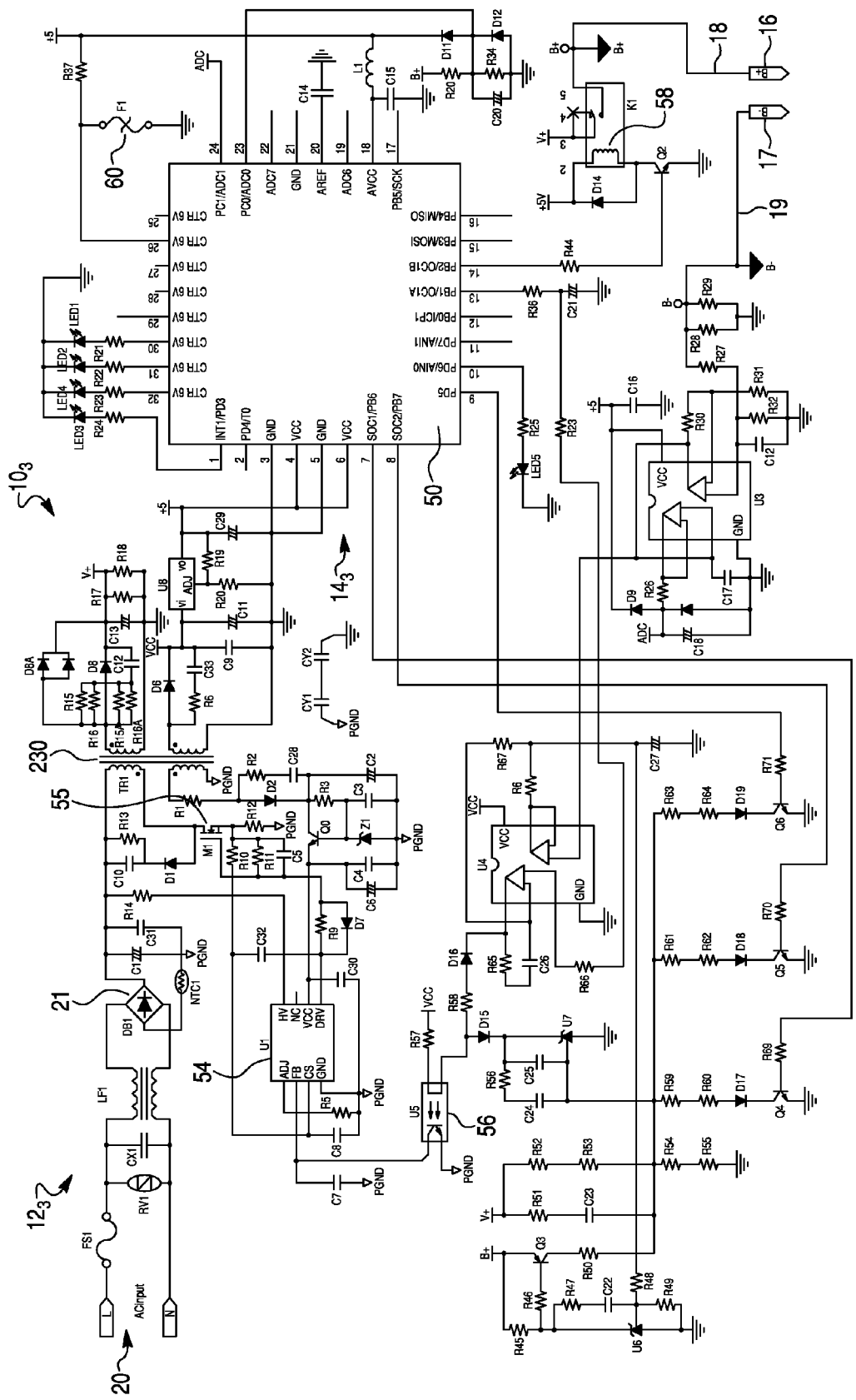
FIG. 9 is an electric circuit diagram of the device in accordance with the third exemplary embodiment of the present invention.

FIGS. 8 and 9 illustrate a device $10_3$ for rated voltage detection and charging of electric batteries according to a third exemplary embodiment of the present invention. Components, which are unchanged from the previous exemplary embodiments of the present invention, are labeled with the same reference characters. Components, which function in the same way as in the first exemplary embodiment of the present invention depicted in FIGS. 1-4 are designated by the same reference numerals to which the subscript 3 or 200 has been added, sometimes without being described in detail since similarities between the corresponding parts in the two embodiments will be readily perceived by the reader.

The detection and charging device (or detection/charging device) $10_3$ is provided for automatic voltage detection for batteries rated 6 or 12 volt. As illustrated in FIGS. 8 and 9, the detection/charging device $10_3$ comprises a casing $11_3$ housing a battery charging unit $12_3$ and a voltage detection unit $14_3$ operatively (electrically) connected the battery charging unit $12_3$, and includes a control panel $15_3$ provided with a number of control lights. The voltage detection unit $14_3$ of the detection/charging device $10_3$ can be configured to automatically control some or all of the operation thereof. Various charging characteristics may be specified.

The control panel $15_3$ of the detection/charging device $10_3$ includes a "Power" LED light $31_3$, a "Full Charge" LED light $32_3$, a "Fault" LED light $44_3$, and 6 Volt and 12 Volt LED lights $46_3$ and $48_3$, respectively. The detection/charging device $10_3$ has only one charge rate setting for 6 and 12 Volt batteries: 2 A (Trickle Charge).

FIG. 9 illustrates an electric circuit diagram of the voltage detection/charging device $10_3$. As noted above, the detection/charging device $10_3$ is configured to automatically control some or all of the operation of the battery charging unit $12_3$. The voltage detection unit $14_3$ of the detection/charging device $10_3$ is provided to monitor the battery status (i.e. configured to monitor various characteristics of the battery 22), such as the battery voltage and battery current. The voltage detection unit $14_3$ may monitor characteristics of the battery in real time, and report the condition and/or characteristics of the battery 22 on the control panel $15_3$. By continuously monitoring one or more characteristics of the battery 22, the detection/charging device $10_3$ may also control for various charging errors, such as short circuit, overload, overheat, reverse connection, etc. The battery charging unit $12_3$ provided to charge the battery 22 produces a full waved rectified voltage. The battery charging unit $12_3$ includes the AC input 20, a bridge type rectifier 21 configured to convert the AC voltage to full wave DC voltage, and a transformer 230. The transformer 230 is selectively connected to the terminals 23, 24 of the battery 22 through the positive and negative battery booster cables 18 and 19. In the case of standard U.S. household current the frequency of the voltage is 60 Hz.

The voltage detection unit $14_3$ includes an electronic control unit (ECU) in the form of a microprocessor (MCU) 50. The microprocessor 50 is configured to control proper operation and fault detection of the detection/charging device $10_3$ and to monitor a plurality of characteristics of the battery 22, including a terminal voltage $V_T$ of the electric battery 22 and a current supplied by the battery 22. Those skilled in the art would understand that the term "terminal voltage" is conventionally known in the art as a voltage measured at battery terminals. The terminal voltage of a battery can be measured as an indication of state of charge of the battery. Moreover, the microprocessor (MCU) 50 further controls charging current, charging voltage, charging time, LED light status, etc. The voltage detection unit $14_3$ also includes an integrated circuit (IC) 54 provided to control a MOSFET 55 and the output of the transformer 30, an optocoupler 56, a relay 58 and a 95° C. thermal protector 60.

The voltage detection/charging device $10_3$ is provided to determine a condition of the battery 22 based on a comparison of the terminal voltage $V_T$ of the electric battery 22 to a number of threshold voltages between a minimum threshold DC voltage $V_{MIN}$ and a maximum threshold DC voltage $V_{MAX}$, conduct a pre-charge process if a certain condition of the battery 22 is met, determine a rated voltage of the battery 22 based on a response to the pre-charge process, and activate the battery charging unit $12_3$ for charging the battery 22 according to the determined rated voltage. According to the third exemplary embodiment of the present invention, the voltage detection/charging device $10_3$ is provided to detect the rated voltage and charge the electric batteries with two different rated voltages: 6V and 12V.

Figure 10:
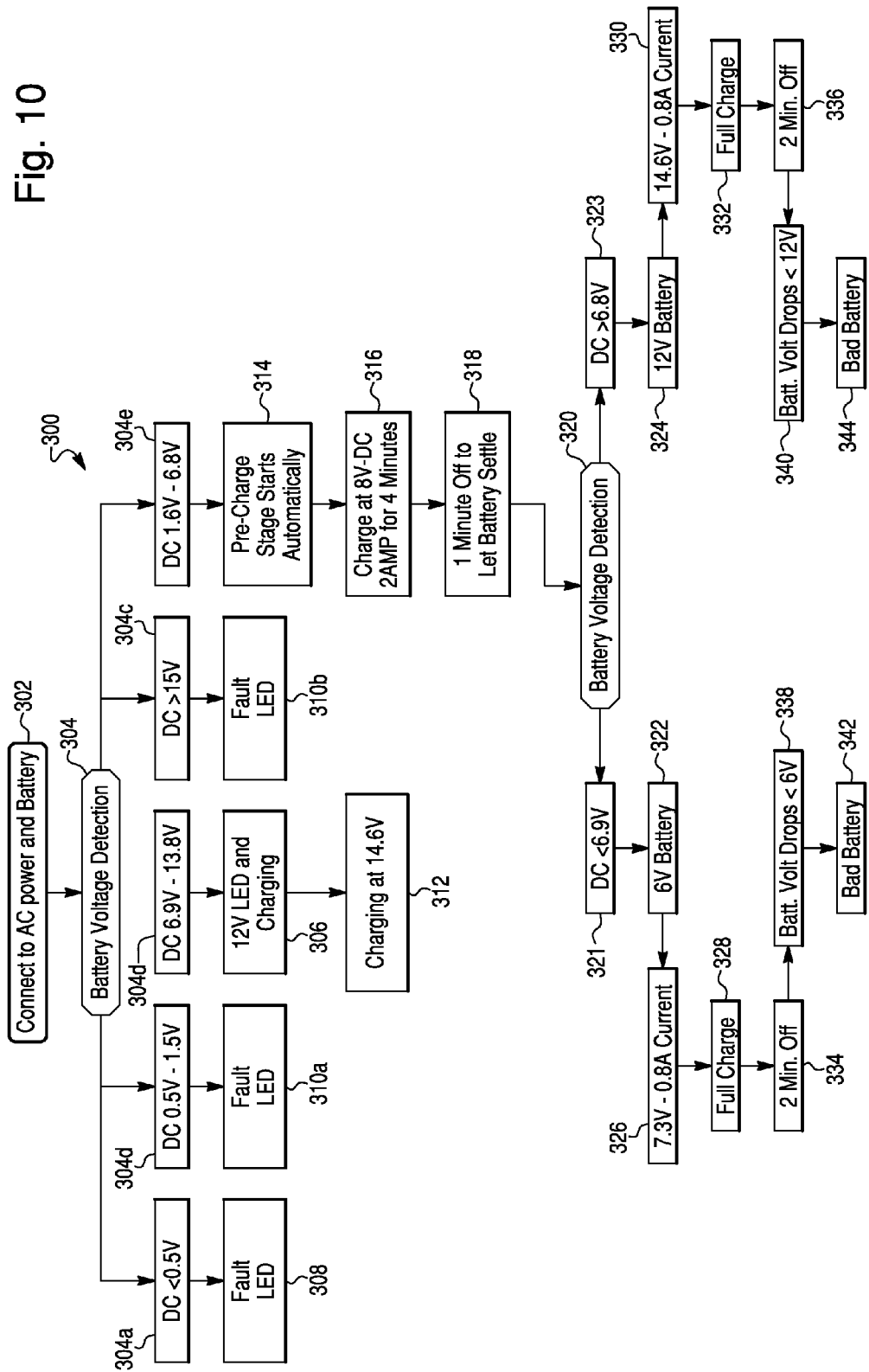
FIG. 10 is a flowchart of the method for rated voltage detection and charging of the electric battery in accordance with the third exemplary embodiment of the present invention.

FIG. 10 is a flowchart illustrates a method 300 for rated voltage detection and charging of the electric battery in accordance with the third exemplary embodiment of the present invention, which can be implemented by the voltage detection/charging device $10_3$. The third exemplary embodiment of the present invention relates to the device for voltage detection and charging of the electric batteries having two different rated voltages: 6 V (a first rated voltage) and 12 V (a second rated voltage).

In a first step 302, the voltage detection/charging device $10_3$ is connected the AC power source, such as a conventional 120 volt, 60 Hz circuit, through the electrical connector (AC input) 20. Moreover, in the first step 302, the voltage detection/charging device $10_3$ is connected to the electric battery 22 via the battery terminal clamps 16, 17 of the battery booster cables 18, 19.

After the initial step 302, the voltage detection/charging device $10_3$ goes on to a step 304 of detecting the rated voltage of the battery 22 by, first, measuring the terminal voltage $V_T$ of the electric battery 22, then comparing the terminal DC voltage to a number of threshold voltages between a minimum threshold DC voltage $V_{MIN}$ and a maximum threshold DC voltage $V_{MAX}$. Obviously, the maximum threshold DC voltage $V_{MAX}$ is larger than the minimum threshold DC voltage $V_{MIN}$ (i.e., $V_{MAX}>V_{MIN}$). Preferably, according to the third exemplary embodiment of the present invention, the minimum threshold DC voltage $V_{MIN}$ is 0.5 VDC (volts of direct current), while the maximum threshold DC voltage $V_{MAX}$ is 15 VDC. The threshold voltages, besides the minimum threshold DC voltage $V_{MIN}$ and the maximum threshold DC voltage $V_{MAX}$, are: a first threshold DC voltage $V_1$ (1.5 VDC according to the first exemplary embodiment of the present invention), a second threshold DC voltage $V_2$ (6.9 VDC according to the first exemplary embodiment of the present invention), and a third threshold DC voltage $V_3$ (13.8 VDC according to the first exemplary embodiment of the present invention).

Next, a condition of the electric battery 22 is determined by the microprocessor 50 of the voltage detection unit $14_3$ based on a comparison of the terminal voltage $V_T$ to the threshold voltages. The condition of the electric battery 22 determined by the voltage detection unit $14_3$ is one of "12V and ready-to-charge" 306 and "Fault" (310a, 310b and 310c, or [310]). The term "Fault" condition means that the connection between the voltage detection/charging device $10_3$ and the electric battery 22 is bad, or that the electric battery 22 cannot function as intended (for intended purposes). According to the third exemplary embodiment of the present invention, the "Fault" condition [310] is determined by the voltage detection unit $14_3$ when the terminal voltage $V_T$ of the battery 22 is less than the minimum threshold DC voltage $V_{MIN}$ (i.e., when $V_T<V_{MIN}$) (the step 304a). In other words, according to the third exemplary embodiment of the present invention, the "Fault" condition [310] is determined when the terminal voltage $V_T$ of the battery 22 is less than 0.5 VDC (i.e., when $V_T<0.5$ VDC).

The "Fault" condition [310] is also determined when the terminal voltage $V_T$ of the electric battery 22 is equal or more than the minimum threshold DC voltage $V_{MIN}$ and equal or less than the first threshold DC voltage $V_1$ (i.e., when $V_{MIN} \leq V_T \leq V_1$) (step 304b, condition 310a), or when the terminal voltage of the battery 22 is more than the maximum threshold DC voltage $V_{MAX}$ (i.e., when $V_T>V_{MAX}$) (step 304c, condition 310b). In other words, according to the third exemplary embodiment of the present invention, the "Fault" condition [310] is determined by the voltage detection unit $14_3$ when the terminal voltage $V_T$ of the battery 22 is less than 0.5 VDC (i.e., when $V_T<0.5$ VDC) (step 304a, condition 310c), when the terminal voltage $V_T$ of the battery 22 is between equal or more than 0.5 VDC and equal or less than 1.5 VDC (i.e., when 0.5 VDC$\leq V_T \leq$1.5 VDC) (step 304b, condition 310a), or when the terminal voltage of the battery is more than 15 VDC (i.e., when $V_T>$15 VDC) (step 304c, condition 310b). If the "Fault" condition [310] is determined, the "Fault" LED light $44_3$ is illuminated.

The "12V and ready-to-charge" condition 306 is determined by the microprocessor 50 when the terminal voltage $V_T$ of the electric battery 22 is equal or more than the second threshold DC voltage $V_2$ and equal or less than the third threshold DC voltage $V_3$ (i.e., when $V_2 \leq V_T \leq V_3$) (step 304d). In other words, according to the third exemplary embodiment of the present invention, the "12V and ready-to-charge" condition is determined by the voltage detection unit $14_3$ when the terminal voltage $V_T$ of the battery 22 is equal or more than 6.9 VDC and equal or less than 13.8 VDC (i.e., when 6.9 VDC$\leq V_T \leq$13.8 VDC, or when the terminal voltage $V_T$ is in the range 6.9 VDC-13.8 VDC) (step 304d). Moreover, when the microprocessor 50 of the voltage detection unit $14_3$ determines that a battery condition is "12V and ready-to-charge" (i.e., when the terminal voltage $V_T$ is in the range 6.9 VDC-13.8 VDC), then the microprocessor 50 determines that the electric battery 22 is rated at 12 V. Consequently, the "12 V" LED lamp $48_3$ is illuminated on the control panel $15_3$ of the voltage detection/charging device $10_3$, and charging of the electric battery 22 is initiated at the step 312 by the battery charging unit $12_3$ at a charging DC voltage equal to 14.6 VDC according to the third exemplary embodiment of the present invention.

However, if the condition of the electric battery 22 determined by the microprocessor 50 is neither "12V nor ready-to-charge" nor "fault", both the "6 Volt" and "12 Volt" LED lights $46_3$ and $48_3$ will flash, thus indicating that a pre-charge process needs to be conducted. Subsequently, the microprocessor 50 of the voltage detection unit $14_3$ instructs the battery charging unit $12_3$ to conduct a pre-charge process, and the battery charging unit $12_3$ will initiate the pre-charge process. In other words, the step of conducting the pre-charge process is initiated when the terminal voltage $V_T$ of the electric battery 22 is more than the first threshold DC voltage $V_1$ and less than the second threshold DC voltage $V_2$ (the step 304e). According to the third exemplary embodiment of the present invention, the step of conducting a pre-charge process is initiated when the terminal voltage $V_T$ of the electric battery 22 is more than 1.6 VDC and less than 6.8 (i.e., when 1.5 VDC<$V_T$<6.9 VDC, or when the terminal voltage $V_T$ is in the range 1.6 VDC-6.8 VDC).

During the step 316 of the pre-charge process, the electric battery 22 is pre-charged for a first predetermined period of time by a pre-charge DC current $I_{PRE}$ at a pre-charge DC voltage $V_{PRE}$, which is less than $V_{MAX}$ and higher than $V_{MIN}$. As noted above, according to the third exemplary embodiment of the present invention, the pre-charge current $I_{PRE}$ is 2 A for trickle charging of the electric battery 22. Further according to the third exemplary embodiment of the present invention, the pre-charge voltage $V_{PRE}$ is 8 VDC, while the first predetermined period of time is 4 minutes.

Following the step 316 of pre-charging the battery at the pre-charge DC voltage $V_{PRE}$ for the first predetermined period of time by the pre-charge DC current $I_{PRE}$, the pre-charge process ends with the step 318 of stopping the pre-charge process for a second predetermined period of time in order to allow the battery 22 to settle. According to the third exemplary embodiment of the present invention, the second predetermined period of time is 1 minute.

Next, a rated voltage of the electric battery 22 is determined (the step 320) by the microprocessor 50 of the voltage detection unit $14_3$ based on a response to the pre-charge process, which includes the steps 314, 316 and 318. As noted above, the rated voltage of the electric battery 22 according to the third exemplary embodiment of the present invention could be 6 V (the first rated voltage) or 12 V (the second rated voltage). In turn, the step 320 of determining the rated voltage of the electric battery 22, executed following the pre-charge process (steps 314, 316 and 318), includes the following steps. First, the terminal voltage $V_T$ of the electric battery 22 is measured by the voltage detection unit $14_3$ following the pre-charge process. Then, the voltage detection unit $14_3$ determines that the electric battery 22 has the first rated voltage (6 V) (the step 322) if the terminal voltage $V_T$ of the electric battery 22 after the pre-charge process is less than the second threshold DC voltage $V_2$ (the step 321). In other words, if $V_T<6.9$ VDC (the step 321), then it is determined that the electric battery 22 is rated 6 V (the step 322). Consequently, the "6 V" LED lamp $46_3$ is illuminated on the control panel $15_3$ of the voltage detection/charging device $10_3$.

Similarly, if the terminal voltage $V_T$ of the electric battery 22 after the pre-charge process is equal or more than the second threshold DC voltage $V_2$ (the step 323), then the voltage detection unit $14_3$ determines that the electric battery 22 has the second rated voltage (12 V) (the step 324). In other words, if $V_T>6.8$ VDC (the step 323), then it is determined that the electric battery 22 is rated 12 V (the step 324). Consequently, the "12 V" LED lamp $48_3$ is illuminated on the control panel $15_3$ of the voltage detection/charging device $10_3$.

Subsequently, the electric battery 22 is charged by the battery charging unit $12_3$ according to the determined voltage rating. More specifically, the electric battery 22 is charged at a first charging DC voltage $V_{CH1}$ by a first charging current $I_{CH1}$ (the step 326) until fully charged (the step 328) if the battery 22 is determined to have the first rated voltage (6 V) (in the step 322), and at a second charging DC voltage $V_{CH2}$ by a second charging current $I_{CH2}$ (the step 330) until fully charged (the step 332) if the battery 22 is determined to have the second rated voltage (12 V) (in the step 324). According to the third exemplary embodiment of the present invention, the first charging DC voltage $V_{CH1}$ is 7.3 VDC, the first charging current $I_{CH1}$ is 0.8 A, the second charging DC voltage $V_{CH2}$ is 14.6 VDC and the second charging current $I_{CH2}$ is 0.8 A.

When the battery 22 is fully charged at the step 328 or 332 (depending on the determined battery voltage rating), the full charge process ends with the step 334 or 336 of stopping the charging process for a third predetermined period of time in order to allow the battery 22 to settle. According to the third exemplary embodiment of the present invention, the third predetermined period of time is 2 minutes.

After the third predetermined period of time expires, the condition of the electric battery 22 is again determined by the microprocessor 50 based on a comparison of the terminal voltage $V_T$ to the first rated voltage (6 V) (if the battery 22 is determined (in the step 322) to have the first rated voltage) in the step 338 or to the second rated voltage (12 V) (if the battery 22 is determined (in the step 324) to have the second rated voltage) in the step 340. The "bad battery" condition is determined by the voltage detection unit $14_3$ when the terminal voltage $V_T$ of the battery 22 is less than the first rated voltage (6 V) (i.e., when $V_T<6$ VDC) if the battery 22 is rated 6 V (the step 342). Similarly, the "bad battery" condition is determined by the voltage detection unit $14_3$ when the terminal voltage $V_T$ of the battery 22 is less than the second rated voltage (12 V) (i.e., when $V_T<12$ VDC) if the battery 22 is rated 12 V (the step 344).

The foregoing description of the preferred embodiments of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A method for rated voltage detection and charging of an electric battery, said method comprising the steps of:
    connecting the electric battery to a power source;
    measuring a terminal voltage of the electric battery having a rated voltage being one of a first rated voltage and a second rated voltage, said first rated voltage being less than said second rated voltage;
    comparing said terminal voltage to a number of threshold voltages between a minimum threshold DC voltage $V_{MIN}$ and a maximum threshold DC voltage $V_{MAX}$;
    determining a condition of the electric battery based on a comparison of said terminal voltage to said threshold voltages, said condition of the electric battery being one of ready to charge and fault;
    determining that said rated voltage of the electric battery being said second rated voltage if said determined condition of the electric battery being ready to charge;
    conducting a pre-charge process if said determined condition of the electric battery is neither ready to charge nor fault;
    determining said rated voltage of the electric battery based on a response to said pre-charge process; and
    charging the electric battery according to said rated voltage determined in the preceding step.

2. The method as defined in claim 1, wherein said first rated voltage of the electric battery is one of 6 V and 12 V, and said second rated voltage of the electric battery is one of 12 V and 24 V.

3. The method as defined in claim 1, wherein said minimum threshold DC voltage $V_{MIN}$ is 0.5 VDC; and wherein said maximum threshold DC voltage $V_{MAX}$ is one of 15 VDC and 30 VDC.

4. The method as defined in claim 1, wherein said pre-charge process, executed prior to the step of determining said rated voltage of the electric battery, includes the step of pre-charging the electric battery at a pre-charge DC voltage $V_{PRE}$ for a first predetermined period of time by a pre-charge DC current $I_{PRE}$, said pre-charge voltage $V_{PRE}$ is less than $V_{MAX}$ and higher than $V_{MIN}$.

5. The method as defined in claim 4, wherein said pre-charge voltage $V_{PRE}$ is one of 8 VDC and 16 VDC.

6. The method as defined in claim 4, wherein said pre-charge current $I_{PRE}$ is one of 2 A, 4 A, 6 A and 10 A.

7. The method as defined in claim 4, wherein said first predetermined period of time is 4 minutes.

8. The method as defined in claim 4, wherein said pre-charge process further includes the step of stopping said pre-charge process for a second predetermined period of time in order to allow the electric battery to settle following the step of pre-charging the electric battery at said pre-charge DC voltage $V_{PRE}$ for said first predetermined period of time by said pre-charge DC current $I_{PRE}$.

9. The method as defined in claim 8, wherein said second predetermined period of time is 1 minute.

10. The method as defined in claim 4, wherein said fault condition of the electric battery is one of bad connection and bad electric battery.

11. The method as defined in claim 10, wherein said bad connection condition is determined when said terminal voltage of the electric battery is less than said minimum threshold DC voltage $V_{MIN}$.

12. The method as defined in claim 11, wherein said bad electric battery condition is determined when said terminal voltage of the electric battery is equal or more than said minimum threshold DC voltage $V_{MIN}$ and equal or less than a first threshold DC voltage $V_1$, or when said terminal voltage of the electric battery is more than said maximum threshold DC voltage $V_{MAX}$.

13. The method as defined in claim 12, wherein said first threshold DC voltage $V_1$ is 1.5 VDC.

14. The method as defined in claim 12, wherein said ready to charge condition is determined when said terminal voltage of the electric battery is equal or more than a second threshold DC voltage $V_2$ and equal or less than a third threshold DC voltage $V_3$.

15. The method as defined in claim 14, wherein said second threshold DC voltage $V_2$ is one of 6.9 VDC and 13.8 VDC; and wherein said third threshold DC voltage $V_3$ is one of 13.8 VDC and 27.6 VDC.

16. The method as defined in claim 14, wherein said pre-charge process is conducted when said terminal voltage of the electric battery is more than said first threshold DC voltage $V_1$ and less than said second threshold DC voltage $V_2$.

17. The method as defined in claim 16, wherein said pre-charge process is conducted when said terminal voltage of the electric battery is equal or more than 1.6 VDC and equal or less one of 6.8 VDC and 13.7 VDC.

18. The method as defined in claim 1, wherein the step of activating said pre-charge process is initiated manually or automatically.

19. The method as defined in claim 1, wherein the step of determining said rated voltage of the electric battery, executed following said pre-charge process, includes the steps of:
measuring said terminal voltage of the electric battery following said pre-charge process;
determining that the electric battery has said first rated voltage if the terminal voltage of the electric battery after said pre-charge process is less than said second threshold DC voltage $V_2$; and
determining that the electric battery has said second rated voltage if said terminal voltage of the electric battery after said pre-charge process is equal or more than said second threshold DC voltage $V_2$.

20. The method as defined in claim 19, wherein the step of charging the electric battery comprises the step of:
charging the electric battery at a first charging DC voltage $V_{CH1}$ by a first charging current $I_{CH1}$ from the power source until fully charged if the electric battery is determined to have said first rated voltage; and
charging the electric battery at a second charging DC voltage $V_{CH2}$ by a second charging current $I_{CH2}$ from the power source until fully charged if the electric battery is determined to have said second rated voltage.

21. The method as defined in claim 20, wherein said first charging DC voltage $V_{CH1}$ is one of 7.3 VDC and 14.6 VDC, and said second charging DC voltage $V_{CH2}$ is one of 14.6 VDC and 28.8 VDC.

22. The method as defined in claim 20, wherein both said first charging current $I_{CH1}$ and said second charging current $I_{CH2}$ is 0.8 A.

23. The method as defined in claim 20, further comprising the step of stopping said charging the electric battery for a third predetermined period of time following the step of fully charging the electric battery.

24. The method as defined in claim 23, wherein said third predetermined period of time is 2 minutes.

25. The method as defined in claim 24, further comprising the steps of:
measuring the terminal voltage of the electric battery following the step of fully charging the electric battery; and
determining that the battery condition is bad electric battery if the terminal voltage of the electric battery after the step of fully charging the electric battery is less than said determined rated voltage of the electric battery.

26. The method as defined in claim 1, further comprising the step of charging the electric battery at said second charging DC voltage $V_{CH2}$ if said ready to charge condition is determined.

27. The method as defined in claim 1, wherein said power source is AC power source.

28. A device for rated voltage detection and charging of an electric battery comprising:
a battery charging unit; and
a voltage detection unit operatively connected to said battery charging unit;
said voltage detection unit including a microprocessor in communication with said battery charging unit and configured to determine a condition of the electric battery based on a comparison of a terminal voltage of the electric battery to a number of threshold voltages between a minimum threshold DC voltage $V_{MIN}$ and a maximum threshold DC voltage $V_{MAX}$, and a rated voltage of the electric battery based on a response to a pre-charge process;
said condition of the electric battery being one of ready to charge and fault;
said rated voltage of the electric battery being one of a first rated voltage and a second rated voltage, said first rated voltage being less than said second rated voltage;
said pre-charge process conducted if said determined condition of the electric battery is neither ready to charge nor fault;
said voltage detection unit further provided to activate said battery charging unit for charging the electric battery according to said determined rated voltage.

* * * * *